United States Patent
Wilson et al.

(10) Patent No.: US 6,748,159 B2
(45) Date of Patent: Jun. 8, 2004

(54) METHOD AND DEVICE FOR RECORDING REAL-TIME INFORMATION

(75) Inventors: Patricia E. M. Wilson, Eindhoven (NL); Robert A. Brondijk, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/270,399

(22) Filed: Oct. 11, 2002

(65) Prior Publication Data
US 2003/0044163 A1 Mar. 6, 2003

Related U.S. Application Data

(63) Continuation of application No. 09/439,197, filed on Nov. 12, 1999, now Pat. No. 6,480,666.

(30) Foreign Application Priority Data

Nov. 16, 1998 (EP) ............................................. 98203857

(51) Int. Cl.[7] ............................ H04N 5/91; H04N 5/781
(52) U.S. Cl. ............................ 386/70; 386/68; 386/125
(58) Field of Search .................... 386/68, 70, 125–126, 386/124, 46, 69, 98, 111; H04N 5/91, 5/781

(56) References Cited

U.S. PATENT DOCUMENTS

| 5,535,008 A | 7/1996 | Yamagishi et al. ......... 386/109 |
| 5,596,564 A | 1/1997 | Fukushima et al. ........... 386/70 |
| 5,771,335 A | 6/1998 | Lee ............................. 386/111 |
| 5,884,004 A | 3/1999 | Sato et al. ..................... 386/98 |
| 6,009,237 A | 12/1999 | Hirabayshi et al. ......... 386/111 |
| 6,269,338 B1 | 7/2001 | Bruekers et al. ............ 704/500 |
| 6,282,320 B1 | 8/2001 | Hasegawa et al. .......... 386/109 |
| 6,480,666 B1 * | 11/2002 | Wilson et al. ................. 386/70 |

FOREIGN PATENT DOCUMENTS

| EP | 0632653 A2 | 1/1995 | ............ H04N/5/92 |
| EP | 0814475 A1 | 12/1997 | ........... G11B/27/00 |

OTHER PUBLICATIONS

PHN 16,452, Ser. No. 08/93,435, now US 6,269,338.

* cited by examiner

Primary Examiner—Vincent Boccio
(74) Attorney, Agent, or Firm—Michael E. Belk

(57) ABSTRACT

A method and device for recording real time information on a record carrier, e.g. video on an optical disc. The information is arranged according to a recording format, e.g. DVD video, for being playable in standardized players. The information is subdivided into units and playback parameters for reproducing sequences of the units are included in the units. The format prescribes forward pointers to units that are located at a large distance from the unit which includes the forward pointers. However for home recording it is required that a recording is made in one pass, i.e. the video is to be recorded directly at its final location without a large buffer. So the device has a small buffer (30), and a processing unit (20,28) for determining pointers to nearby units based on the buffer contents, while values for pointers pointing far forward are set arbitrarily, based on nearby units and/or default values indicating that the unit intended to be pointed to does not exist. Standard playback devices can still play the recorded material in trickplay modes with only minor deviations in the fast forward scanning speed.

35 Claims, 18 Drawing Sheets

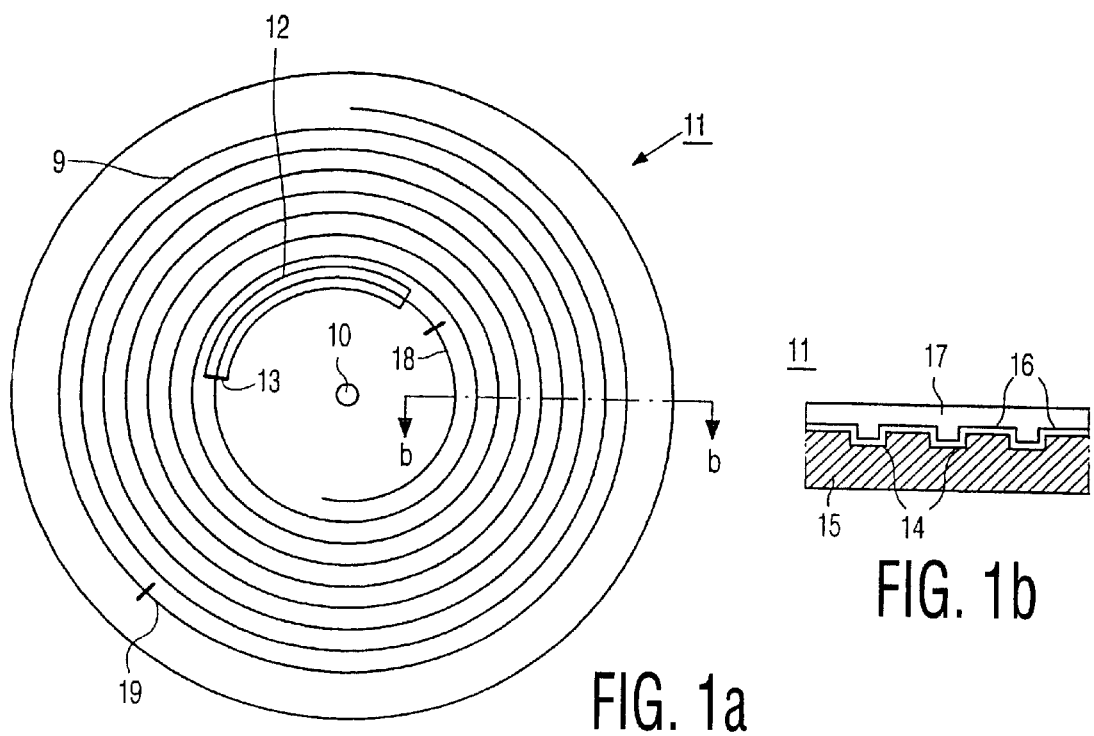
FIG. 1a
FIG. 1b
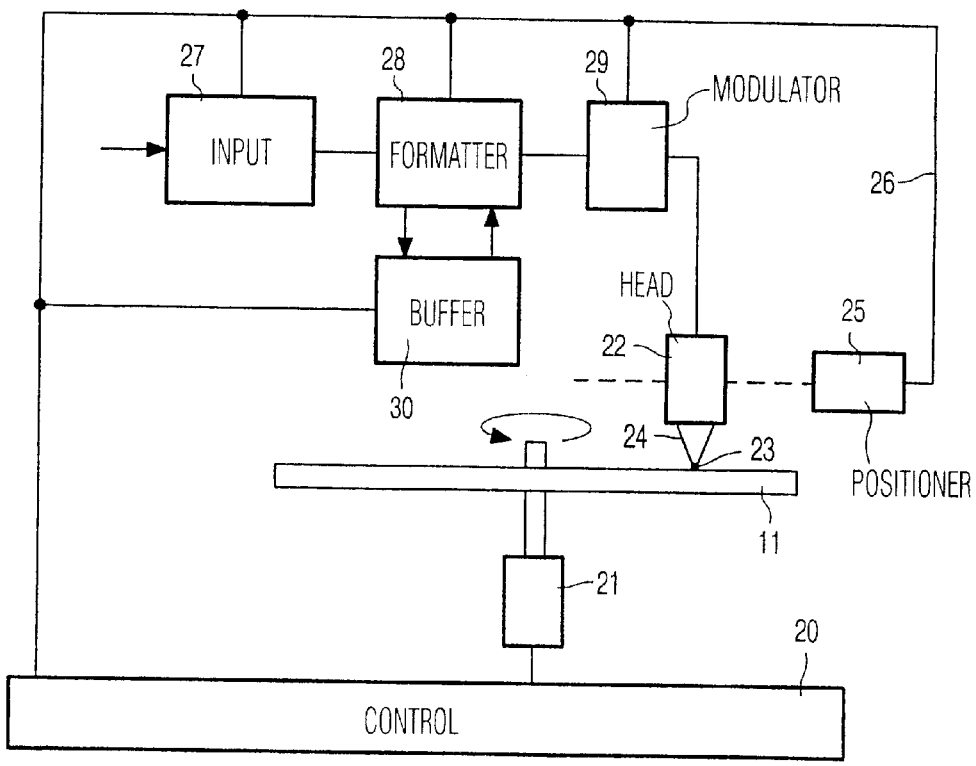
FIG. 2

FIG. 8

| VIDEO TITLE SET (VTS) | |
|---|---|
| VIDEO TITLE SET INFORMATION (VTSI) | (Mandatory) |
| VIDEO OBJECT SET FOR VIDEO TITLE SET MENU (VTSM_VOBS) | (Optional) |
| VIDEO OBJECT SET FOR VIDEO TITLE SET MENU (VTSTT_VOBS) | (Mandatory) |
| BACKUP FOR VIDEO TITLE SET INFORMATION (VTSI_BUP) | (Mandatory) |

| | |
|---|---|
| VIDEO TITLE SET INFORMATION MANAGEMENT TABLE (VTSI_MAT) | (Mandatory) |
| VIDEO TITLE SET PART OF TITLE SEARCH POINTER TABLE (VTS_PTT_SRPT) | (Mandatory) |
| VIDEO TITLE SET PROGRAM CHAIN INFORMATION TABLE (VTS_PGCIT) | (Mandatory) |
| VIDEO TITLE SET MENU PGCI UNIT TABLE (VTSM_PGCI_UT) | (Mandatory) |
| VIDEO TITLE SET TIME MAP TABLE (VTS_TMAPT) | (Optional) |
| VIDEO TITLE SET MENU CELL ADDRESS TABLE (VTSM_C_ADT) | (Mandatory when VTSM_VOBS exists) |
| VIDEO TITLE SET MENU VIDEO OBJECT ADDRESS MAP (VTSM_VOBU_ADMAP) | (Mandatory when VTSM_VOBS exists) |
| VIDEO TITLE SET CELL ADDRESS TABLE (VTS_C_ADT) | (Mandatory) |
| VIDEO TITLE SET VIDEO OBJECT UNIT ADDRESS MAP (VTS_VOBU_ADMAP) | (Mandatory) |

PROGRAM CHAIN INFORMATION (PGCI)

| |
|---|
| PROGRAM CHAIN GENERAL INFORMATION (PGC_GI) |
| PROGRAM CHAIN COMMAND TABLE (PGC_CMDT) |
| PROGRAM CHAIN PROGRAM MAP (PGC_PGMP) |
| CELL PLAYBACK INFORMATION TABLE (C_PBIT) |
| CELL POSITION INFORMATION TABLE (C_POSIT) |

FIG. 10

| DSI_GI (DSI GENERAL INFORMATION) | |
|---|---|
| NV_PCK_SCR | SCR_BASE OF NV_PCK |
| NV_PCK_LBN | LBN OF NV_PCK |
| VOBU_EA | END ADDRESS OF VOBU |
| VOBU_1STREF_EA | END ADDRESS OF THE FIRST REFERENCE PICTURE IN VOBU |
| VOBU_2NDREF_EA | END ADDRESS OF THE SECOND REFERENCE PICTURE IN VOBU |
| VOBU_3RDREF_EA | END ADDRESS OF THE THIRD REFERENCE PICTURE IN VOBU |
| VOBU_VOB_IDN | VOB ID NUMBER OF THE VOBU |
| | RESERVED |
| VOBU_C_IDN | CELL ID NUMBER OF THE VOBU |
| C_ELTM | CELL ELAPSE TIME |

FIG. 15

SML_PBI (SEAMLESS PLAYBACK INFORMATION)

| | |
|---|---|
| VOBU_SML_CAT | CATEGORY OF SEAMLESS VOBU |
| ILVU_EA | END ADDRESS OF INTERLEAVED UNIT |
| NXT_ILVU_SA | START ADDRESS OF THE NEXT INTERLEAVED UNIT |
| NXT_ILVU_SZ | SIZE OF THE NEXT INTERLEAVED UNIT |
| VOB_V_S_PTM | VIDEO START PTM IN VOB |
| VOB_V_E_PTM | VIDEO END PTM IN VOB |
| VOB_A_STP_PTM | AUDIO STOP TIME IN VOB |
| VOB_A_GAP_LEN | AUDIO GAP LENGTH IN VOB |

FIG. 16

| SML_AGLI (SEAMLESS ANGLE INFORMATION) | |
|---|---|
| SML_AGL_C1_DSTA | ADDRESS AND SIZE OF DESTINATION ILVU IN AGL_C1 |
| SML_AGL_C2_DSTA | ADDRESS AND SIZE OF DESTINATION ILVU IN AGL_C2 |
| SML_AGL_C3_DSTA | ADDRESS AND SIZE OF DESTINATION ILVU IN AGL_C3 |
| SML_AGL_C4_DSTA | ADDRESS AND SIZE OF DESTINATION ILVU IN AGL_C4 |
| SML_AGL_C5_DSTA | ADDRESS AND SIZE OF DESTINATION ILVU IN AGL_C5 |
| SML_AGL_C6_DSTA | ADDRESS AND SIZE OF DESTINATION ILVU IN AGL_C6 |
| SML_AGL_C7_DSTA | ADDRESS AND SIZE OF DESTINATION ILVU IN AGL_C7 |
| SML_AGL_C8_DSTA | ADDRESS AND SIZE OF DESTINATION ILVU IN AGL_C8 |
| SML_AGL_C9_DSTA | ADDRESS AND SIZE OF DESTINATION ILVU IN AGL_C9 |

FIG. 17

| CONTENTS | |
|---|---|
| FWDI VIDEO | NEXT VOBU START ADDRESS WITH A VIDEO DATA |
| FWDI 240 | +240 VOBU START ADDRESS AND VIDEO EXIST FLAG |
| FWDI 140 | +120 VOBU START ADDRESS AND VIDEO EXIST FLAG |
| FWDI 60 | + 60 VOBU START ADDRESS AND VIDEO EXIST FLAG |
| FWDI 20 | + 20 VOBU START ADDRESS AND VIDEO EXIST FLAG |
| FWDI 15 | + 15 VOBU START ADDRESS AND VIDEO EXIST FLAG |
| FWDI 14 | + 14 VOBU START ADDRESS AND VIDEO EXIST FLAG |
| FWDI 13 | + 13 VOBU START ADDRESS AND VIDEO EXIST FLAG |
| FWDI 12 | + 12 VOBU START ADDRESS AND VIDEO EXIST FLAG |
| FWDI 11 | + 11 VOBU START ADDRESS AND VIDEO EXIST FLAG |
| FWDI 10 | + 10 VOBU START ADDRESS AND VIDEO EXIST FLAG |
| FWDI 9 | + 9 VOBU START ADDRESS AND VIDEO EXIST FLAG |
| FWDI 8 | + 8 VOBU START ADDRESS AND VIDEO EXIST FLAG |
| FWDI 7 | + 7 VOBU START ADDRESS AND VIDEO EXIST FLAG |
| FWDI 6 | + 6 VOBU START ADDRESS AND VIDEO EXIST FLAG |
| FWDI 5 | + 5 VOBU START ADDRESS AND VIDEO EXIST FLAG |
| FWDI 4 | + 4 VOBU START ADDRESS AND VIDEO EXIST FLAG |
| FWDI 3 | + 3 VOBU START ADDRESS AND VIDEO EXIST FLAG |
| FWDI 2 | + 2 VOBU START ADDRESS AND VIDEO EXIST FLAG |
| FWDI 1 | + 1 VOBU START ADDRESS AND VIDEO EXIST FLAG |
| FWDI NEXT | NEXT VOBU START ADDRESS AND VIDEO EXIST FLAG |
| FWDI PREV | PREVIOUS VOBU START ADDRESS AND VIDEO EXIST FLAG |
| BWDI 1 | − 1 VOBU START ADDRESS AND VIDEO EXIST FLAG |
| BWDI 2 | − 2 VOBU START ADDRESS AND VIDEO EXIST FLAG |
| BWDI 3 | − 3 VOBU START ADDRESS AND VIDEO EXIST FLAG |
| BWDI 4 | − 4 VOBU START ADDRESS AND VIDEO EXIST FLAG |
| BWDI 5 | − 5 VOBU START ADDRESS AND VIDEO EXIST FLAG |
| BWDI 6 | − 6 VOBU START ADDRESS AND VIDEO EXIST FLAG |
| BWDI 7 | − 7 VOBU START ADDRESS AND VIDEO EXIST FLAG |
| BWDI 8 | − 8 VOBU START ADDRESS AND VIDEO EXIST FLAG |
| BWDI 9 | − 9 VOBU START ADDRESS AND VIDEO EXIST FLAG |
| BWDI 10 | − 10 VOBU START ADDRESS AND VIDEO EXIST FLAG |
| BWDI 11 | − 11 VOBU START ADDRESS AND VIDEO EXIST FLAG |
| BWDI 12 | − 12 VOBU START ADDRESS AND VIDEO EXIST FLAG |
| BWDI 13 | − 13 VOBU START ADDRESS AND VIDEO EXIST FLAG |
| BWDI 14 | − 14 VOBU START ADDRESS AND VIDEO EXIST FLAG |
| BWDI 15 | − 15 VOBU START ADDRESS AND VIDEO EXIST FLAG |
| BWDI 20 | − 20 VOBU START ADDRESS AND VIDEO EXIST FLAG |
| BWDI 60 | − 60 VOBU START ADDRESS AND VIDEO EXIST FLAG |
| BWDI 120 | −120 VOBU START ADDRESS AND VIDEO EXIST FLAG |
| BWDI 240 | −240 VOBU START ADDRESS AND VIDEO EXIST FLAG |
| BWDI VIDEO | PREVIOUS VOBU START ADDRESS WITH A VIDEO DATA |

FIG. 18

| SYNCI (SYNC INFORMATION) | |
|---|---|
| A_SYNCA 0 TO 7 | ADDRESS OF AUDIO PACK TO BE SYNCHRONIZED |
| SP_SYNCA 0 TO 31 | VOBU SUBVIDEO PACK STARTING ADDRESS |

FIG. 19

METHOD AND DEVICE FOR RECORDING REAL-TIME INFORMATION

This application is a continuation of Ser. No. 09/439,197 filed Nov. 12, 1999 now U.S. Pat. No. 6,480,666.

FIELD OF THE INVENTION

The invention relates to a method of recording real time information and playback parameters related thereto on a record carrier arranged according to a recording format, in which method the real time information is subdivided into units and the playback parameters are generated and included in the units, which playback parameters comprise pointers to units located at a forward and/or backward distance relative to the unit in which the pointers are included.

The invention further relates to a device for recording real time information and playback parameters related thereto on a record carrier arranged according to a recording format, the recorder comprising processing means for subdividing the real time information into units and for generating the playback parameters to be included in the units, which playback parameters comprise pointers to units located at a forward and/or backward distance relative to the unit in which the pointers are to be included.

BACKGROUND OF THE INVENTION

A method of recording real-time information on a record carrier is known from EP 814475. Real-time information is information having a real-time nature to be reproduced at a prescribed rate, usually audio or video information, or a combination of audio and video. In the known method video information is encoded digitally and subdivided into units, which are short, but independently reproducible segments of the real-time information, while corresponding audio information may be included in the units. Control information for accessing and reproducing the real-time material is generated for enabling several playback functions. A user playable program usually called a title, for example a movie, is constituted by a sequence of units and corresponding control information. Part of the control information, so called playback parameters, are included in the units to enable playback control by using information stored with the related real-time information itself, which reduces the need for memory in the player for storing control information read from separate tables, such as address lists of units. In particular, the playback parameters comprise pointers to units located at a distance in forward or backward direction, usually at fixed intervals in playback time. As the units are stored on the record carrier consecutively, said distance corresponds to a distance along the track between the unit comprising said pointers and such forward and backward units. In the event of a variable bitrate real-time signal, e.g. video after compression by MPEG2, no fixed relation exists between the distance in time and along the track. Also other data, e.g. in the event of multiplexed audio, video and text, may cause a non predictable distance along the track. So said pointers are used in jumps to other units relative to the unit just read. The user may play the movie at standard speed reading the units consecutively, but he may also scan the material in trick play modes, e.g. fast forward or reverse slow motion, using the playback parameters in the units pointing in forward and/or backward direction. The way the control information and the real-time information are provided on a record carrier is standardized to enable players of different brands to reproduce the material. An example of such a standard is the DVD-video standard, of which the relevant aspects, such as the playback parameters, are described in said EP 814475. In the known recording method the playback parameters are generated separately after the video material has been gathered and stored temporarily in a memory, e.g. on a video tape. The real-time information and control information are finally transferred to the record carrier by well known mastering and reproducing steps, e.g. pressing optical discs from a metal master disc. A problem of the known recording method is, that a temporary storage of the real-time information is required before the control information and playback parameters can be generated. On the final product, the record carrier, the playback parameters are to be positioned according to the format rules, which prescribe that the playback parameters are included in the units with the real-time information. However the playback parameters can be generated only after the real-time material is known in forward direction for a period sufficient to determine the prescribed forward pointers, and therefore a large amount of real time information needs to be stored temporarily. Hence the known method of recording is complicated and expensive, in particular in view of home recording.

SUMMARY OF THE INVENTION

It is an object of the invention to provide a recording method and device in which real-time information can be recorded according to an existing format and which is less complex.

For this purpose, the method as described in the opening paragraph is characterized in that the method comprises the steps of buffering the real time information for a period before recording, determining a value for at least one of said pointers based on the buffered real time information, calculating a value for at least a further one of said pointers intended to point to a unit located at a forward distance larger than said period, based on the buffered real time information and/or a predefined value, and recording the buffered real time information together with said determined and calculated values.

During recording some pointer values are determined as prescribed in the recording format based on buffered real-time information in a relatively small buffer. However, further values for pointers intended to point at units further away in forward direction than the period available in the buffer are calculated different from the values prescribed in the recording format. The calculated values are based on units which are present in the buffer, i.e. which are not as far away as intended, or on predefined values, e.g. indicating that a jump-address is not available. This has the effect, that a real-time recording can be made in one pass, i.e. the real-time information is recorded on a record carrier of a writable type directly at its final location without temporary storage, while the playback parameters are generated during recording.

The invention is also based on the following recognition. Formats intended for mastered and mass produced record carriers of a read-only type may prescribe a non-causal order in which playback parameters precede the recorded audio/video, because this is the order playback devices require the information for reproduction. Non-causality inherently arises during recording, because one cannot calculate pointer values for video material not yet available, in particular if the video is compressed to a variable length digital code such as MPEG2. For a professional recording studio this presents no problem, as the audio/video material is always stored in its entirety in a temporary storage device, e.g. on a master video tape, before the final authoring process is performed, in which the playback parameters are determined. In a home recorder one-pass recording is required, and therefore the DVD-video format seems unsuitable. However the inventors have seen, that playback devices respond in a predefined way to some calculated or predefined values for playback parameters which deviate from the prescribed values, for example by using a different jumping mechanism, e.g. in DVD players for fast forward a jump to a next cell is performed when the playback parameters indicate that no forward unit is available in the cell. So the prescribed playback parameters included in the units can be acceptably approached by setting the pointers pointing far forward to some calculated or predefined value. In that event the scanning mode may be somewhat faster then intended, because in said scanning mode jumps are made from cell to cell based on a cell address table present elsewhere in the DVD format, instead of the shorter jumps originally intended. The scanning mode may alternatively be somewhat slower, if the pointer values are calculated to point at existing units less far away than intended.

According to the invention the device as described in the opening paragraph is characterized as claimed in claim 5. Preferred embodiments of the method and device according to the invention are given in the dependent claims.

BRIEF DESCRIPTION OF THE DRAWINGS

These and other aspects of the invention will be apparent from and elucidated further with reference to the embodiments described by way of example in the following description and with reference to the accompanying drawings, in which FIG. 1 shows a record carrier, FIG. 2 shows a recording device, FIG. 8 shows video title set information in a video title set, FIG. 10 shows the structure, of program chain information, FIG. 15 shows information described in the data search general information, FIG. 16 shows information described in the seamless playback information, FIG. 17 shows the contents of the seamless angle information, FIG. 18 shows the VOBU search information, FIG. 19 shows the structure of audio synchronization information.

Corresponding elements in different Figures have identical reference numerals.

DETAILED DESCRIPTION OF THE DRAWINGS

Figure 3:
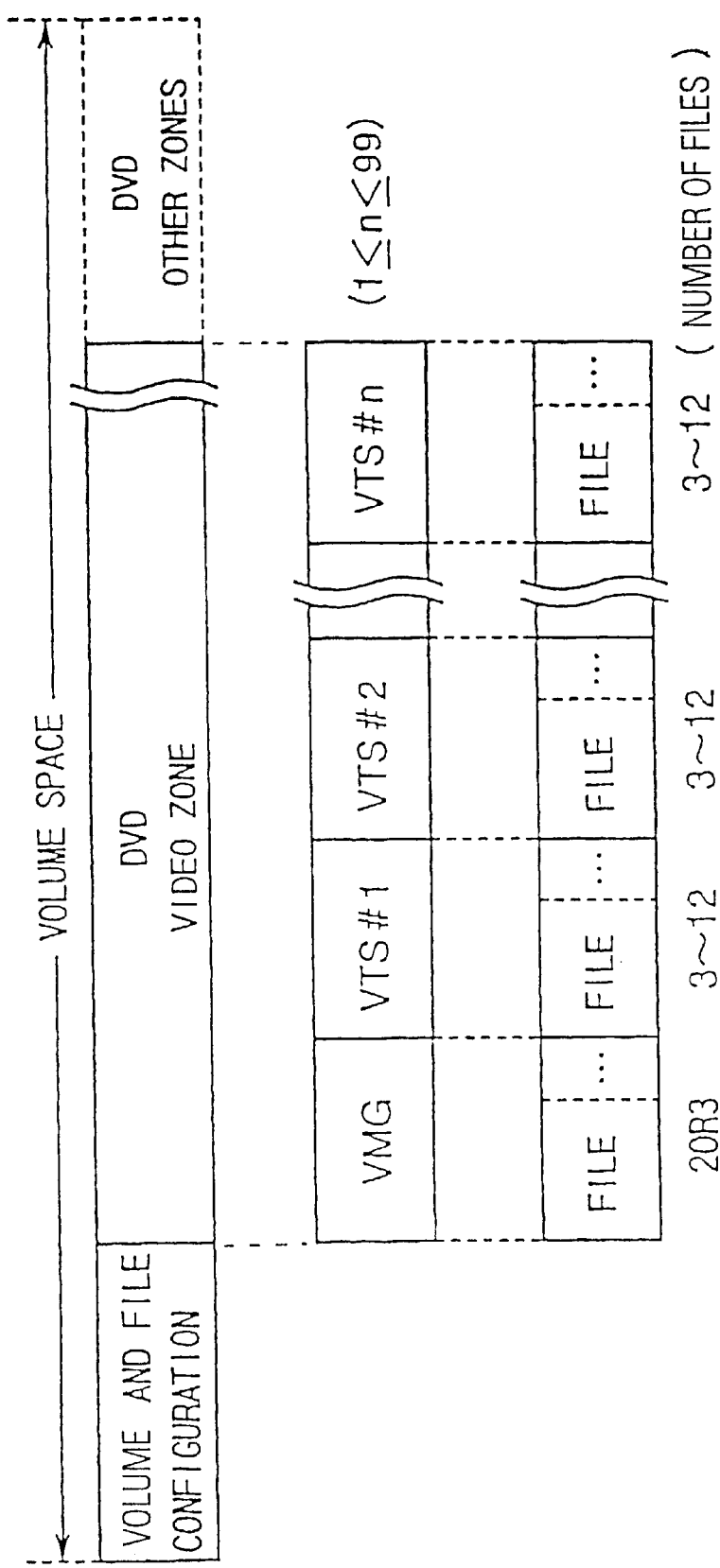
FIG. 3 shows volume space on an optical disk.

FIG. 1a shows a disc-shaped record carrier 11 having a track 9 and a central hole 10. The track 9 is arranged in accordance with a spiral pattern of turns constituting substantially parallel tracks on an information layer. The record carrier may be optically readable, called an optical disc, and has an information layer of a recordable type. Examples of a recordable disc are the CD-R and CD-RW, and writable versions of DVD, such as DVD–RAM and DVD+RW. The track 9 on the recordable type of record carrier is indicated by a pre-embossed track structure provided during manufacture of the blank record carrier. The track structure is constituted, for example, by a pregroove 14 which enables a read/write head to follow the track during scanning. The information is represented on the information layer by optically detectable marks recorded along the track, e.g. pits and lands.

FIG. 1b is a cross-section taken along the line b—b of the record carrier 11 of the recordable type, in which a transparent substrate 15 is provided with a recording layer 16 and a protective layer 17. The pregroove 14 may be implemented as an indentation or an elevation, or as a material property deviating from its surroundings.

The record carrier 11 is intended for carrying real-time information according to a standardized format, to be playable on standardized playback devices. The recording format includes the way information is recorded, encoded and logically mapped. The logical mapping may comprise a subdivision of the available area in a lead-in 18, a recording area for user data and a lead-out 19. Further the mapping may comprise file management information for retrieving the user information, such as a Table Of Contents or a file system, e.g. ISO 9660 for CD-ROM or UDF for DVD-ROM. Such file management information is mapped on a predefined location on the record carrier, usually in or directly after the lead-in area. However this document further relates to aspects of the format relating to the way the real-time information is recorded, i.e. format of the video and/or audio information and its corresponding control information. The record carrier 11 is provided with a starting point 13 for creating a free area 12 for accommodating control information related to recorded real-time information. The real-time recording process is described below with reference to FIG. 20.

FIG. 2 shows a recording device for writing information on a record carrier 11 of a type which is (re)writable. The device is provided with drive means 21 for rotating the record carrier 1, and a head 22 for scanning the track on the record carrier. The apparatus is provided with positioning means 25 for coarsely positioning the head 22 in the radial direction on the track. The head comprises an optical system of a known type for generating a radiation beam 24 guided through optical elements focused to a radiation spot 23 on a track of the information layer of the record carrier. The radiation beam 24 is generated by a radiation source, e.g. a laser diode. The head further comprises a focusing actuator for moving the focus of the radiation beam 24 along the optical axis of said beam and a tracking actuator for fine positioning of the spot 23 in a radial direction on the center of the track. The tracking actuator may comprise coils for radially moving an optical element or may be arranged for changing the angle of a reflecting element. For writing information the radiation is controlled to create optically detectable marks in the recording layer. For reading the radiation reflected by the information layer is detected by a detector of a usual type, e.g. a four-quadrant diode, in the head 22 for generating a read signal and further detector signals including a tracking error and a focusing error signal coupled to said tracking and focusing actuators. The read signal is processed by a reading means of a usual type (not shown) to retrieve the information. The device comprises recording means for processing the real-time information to generate a write signal to drive the head 22. The recording means comprise an input unit 27, a formatting unit 28, a modulation unit 29 and a control unit 20 for receiving commands from a user or from a host computer. The formatting unit is coupled to a buffer unit 30 for temporarily storing the incoming real-time data. The control unit 20 is connected via control lines 26, e.g. a system bus, to said recording means, the buffer means 30, the drive means 21, and the positioning means 25. The control unit 20 comprises control circuitry, for example a microprocessor, a program memory and control gates, for performing the procedures and functions according to the invention as described below with reference to FIG. 20. The control unit 20 may also be implemented as a state machine in logic circuits. The control unit 20 and the formatting means 28 constitute processing means for subdividing the real time information into units and for generating playback parameters to be included in the units, which playback parameters comprise pointers to units located at a forward and/or backward distance relative to the unit in which the pointers are to be included. The recording method as performed by the processing means is described below in detail with reference to FIG. 20. During the writing operation, marks representing the information are formed on the record carrier. The marks may be in any optically readable form, e.g. in the form of areas with a reflection coefficient different from their surroundings, obtained when recording in materials such as dye, alloy or phase change material, or in the form of areas with a direction of magnetization different from their surroundings, obtained when recording in magneto-optical material. Writing and reading of information for recording on optical disks and usable formatting, error correcting and channel coding rules are well-known in the art, e.g. from the CD system. The marks can be formed by means of a spot 23 generated on the recording layer via a beam 24 of electromagnetic radiation, usually from a laser diode. The recording means further include an input unit 27, a formatting unit 28, and a modulation unit 29. User information is presented on the input unit 27, which may comprise of compression means for analog audio and/or video, or for digital uncompressed audio/video. Suitable compression means are described for audio in WO 98/16014-A1 (PHN 16452) and for video in the MPEG2 standard. From the input unit 27 the data is passed to the formatting unit 28 for adding control data and formatting the data according to the recording format. The data stream to be recorded is passed to the modulation unit 29, which drives the head 22, and which comprises for example an error coder and a channel coder. The data presented to the input of the modulation unit 29 is written to sectors on the record carrier under the control of control unit 20. Usually the recording apparatus will also be arranged for reading having the reading and decoding means of a playback apparatus and a combined write/read head.

First a recording format is described. The format substantially corresponds to the DVD-Video standard.

FIG. 3 shows volume space on the optical disk 11. As shown in FIG. 3, the volume space consists of a volume and file configuration zone, a DVD-video zone, and other zones. In the volume and file configuration zone is described a UDF (Universal Disk Format Specification Revision 1.02) configuration, the data of which can be read by any computer that meets a predetermined standard. The DVD-video zone has a video manager (VMG) and a video title set (VTS). The video manager (VMG) and the video title set (VTS) each consist of multiple files. The video manager (VMG) is information for controlling the video title set (VTS).

Figure 4:
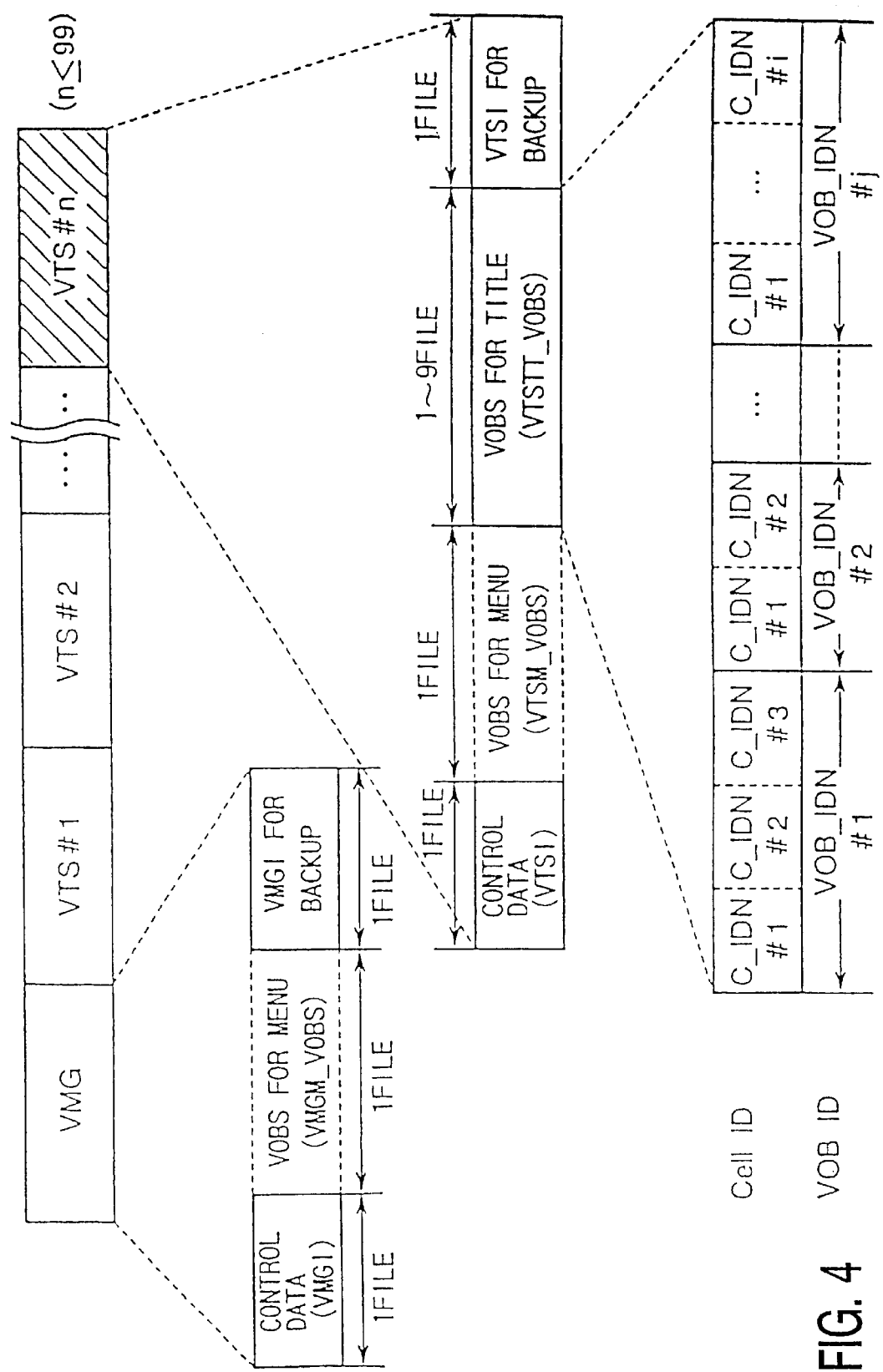
FIG. 4 shows the logical structures of the video manager and the video title sets in more detail.

In FIG. 4 shows the structures of the video manager (VMG) and the video title set (VTS) in more detail. The video manager (VMG) has video manager information (VMGI) as control data and a video object set (VMGM_VOBS) as data for menu display. Also, backup video manager information (VMGI_BUP) that is identical in content to the VMGI is included. The video title set (VTS) contains video title set information (VTSI) as control data, optionally a video object set (VTSM_VOBS) as data for menu display, and a video object set (VTSTT_VOBS) for the title(s) of a video title set that is a video object set for video display. Also, backup video title set information (VTSI_BUP) that is identical in content to the VTSI is included. The video object set (VTSTT_VOBS) for video display is made up by multiple cells grouped in VOBs. Each cell in a VOB is assigned a cell identification number.

Figure 5:
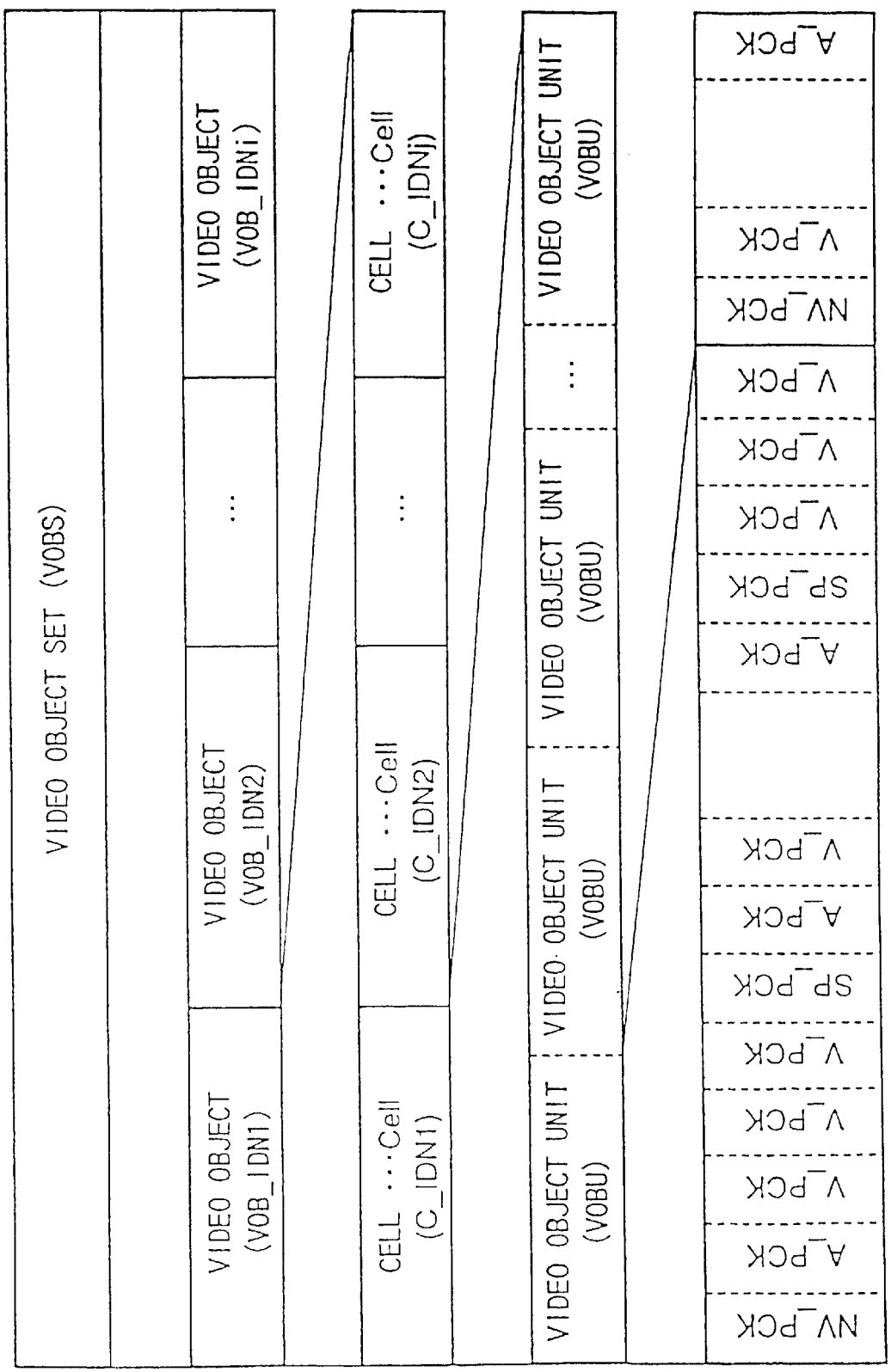
FIG. 5 shows a relationship between video object set and cells and the contents of the cells hierarchically.

FIG. 5 shows a relationship between the video object set (VOBS) and the cells and the contents of the cells hierarchically. When DVD playback processing is performed, video breaks (scene changes, angle changes, story changes, etc.) and special playback are handled in units of cells (Cell), or in interleaved units (ILVU), or in units of video object units (VOBU) that are in a layer below the cells. First, the video object set (VOBS) comprises multiple video objects (VOB_IDN1 to VOB_IDNi). Moreover, one video object comprises multiple cells (C_IDN1 to C_IDNj). Furthermore, one cell (cell) comprises multiple video object units (VOBU) or interleaved units that are described later. One video object unit (VOBU) comprises one navigation pack (NV_PCK), multiple audio packs (A_PCK), multiple video packs (V_PCK), and multiple subpicture packs (SP_PCK). The navigation pack (NV_PCK) is mainly used as control data for control of reproduced display of data in the video object unit to which it belongs and control data for search for data in the video object unit. The video pack (V_PCK) is main video information, which is compressed in accordance with the MPEG2 standard or the like. The subpicture pack (SP_PCK) is sub video information having contents that are auxiliary to main video, such as subtitles. The audio pack (A_PCK) is sound information.

Figure 6:
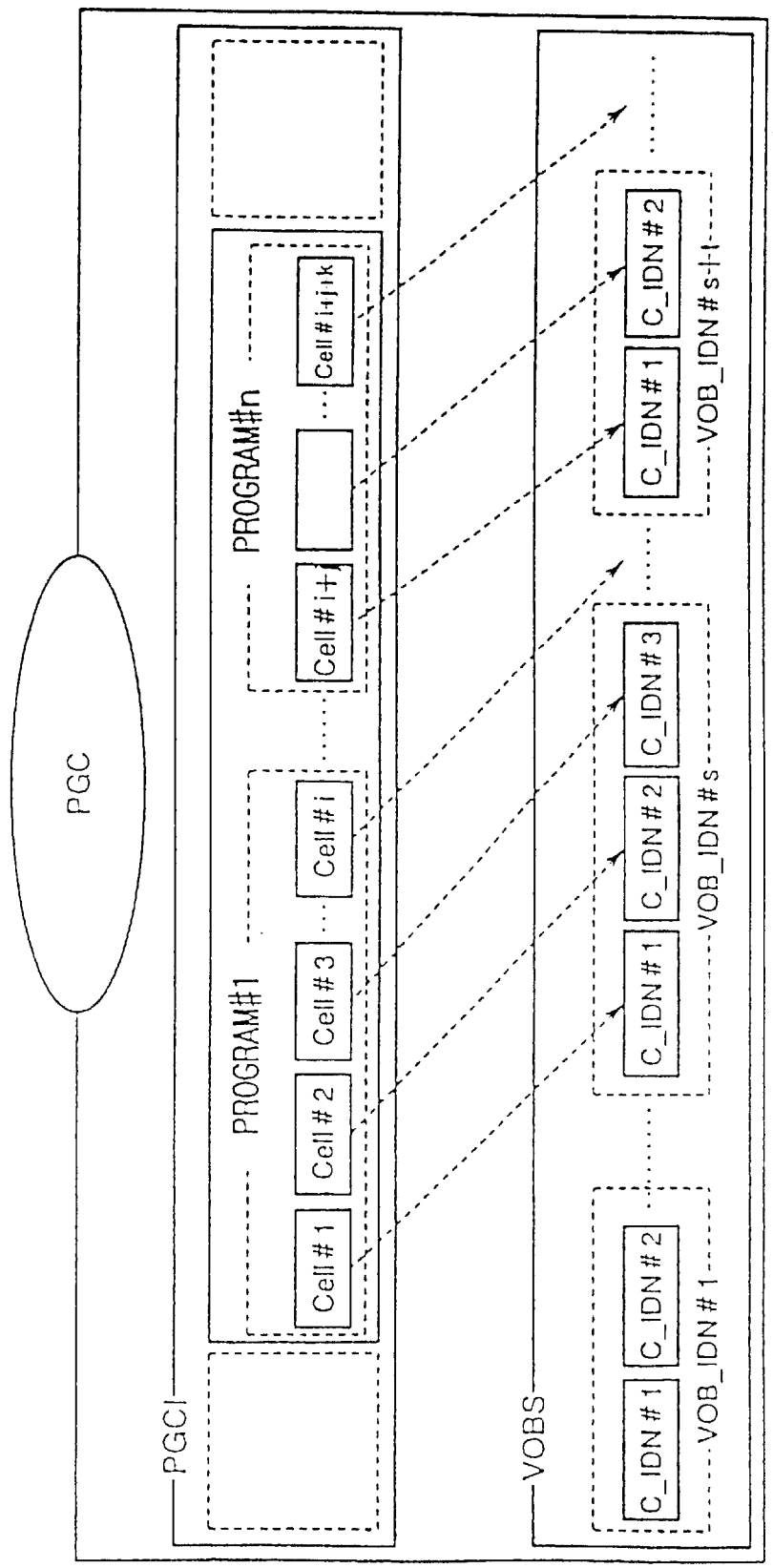
FIG. 6 shows a diagram of controlling the sequence of playback of the cells by a program chain.

FIG. 6 shows a diagram of controlling the sequence of playback of the cells (Cells) by a program chain (PGC). As the program chain (PGC), various program chains (PGC#1, PGC#2, PGC#3, . . . ) are prepared so as to allow the order of playback of data cells to be set variously. Therefore, the order of playback of cells will be set by making a choice among the program chains. An example in which program #1 to program #n described by program chain information (PGCI) are executed is shown. The program shown has the contents to specify a cell specified by (VOB_IDN#s, C_IDN#1) and subsequent cells within the video object set (VOBS) in turn. The program chain, recorded on the management information recording area of the optical disk, is information that is read prior to the reading of the video title set of the optical disk and then stored in the memory in the system controller. The management information is placed at the beginning of the video manager and each video title set.

Figure 7:
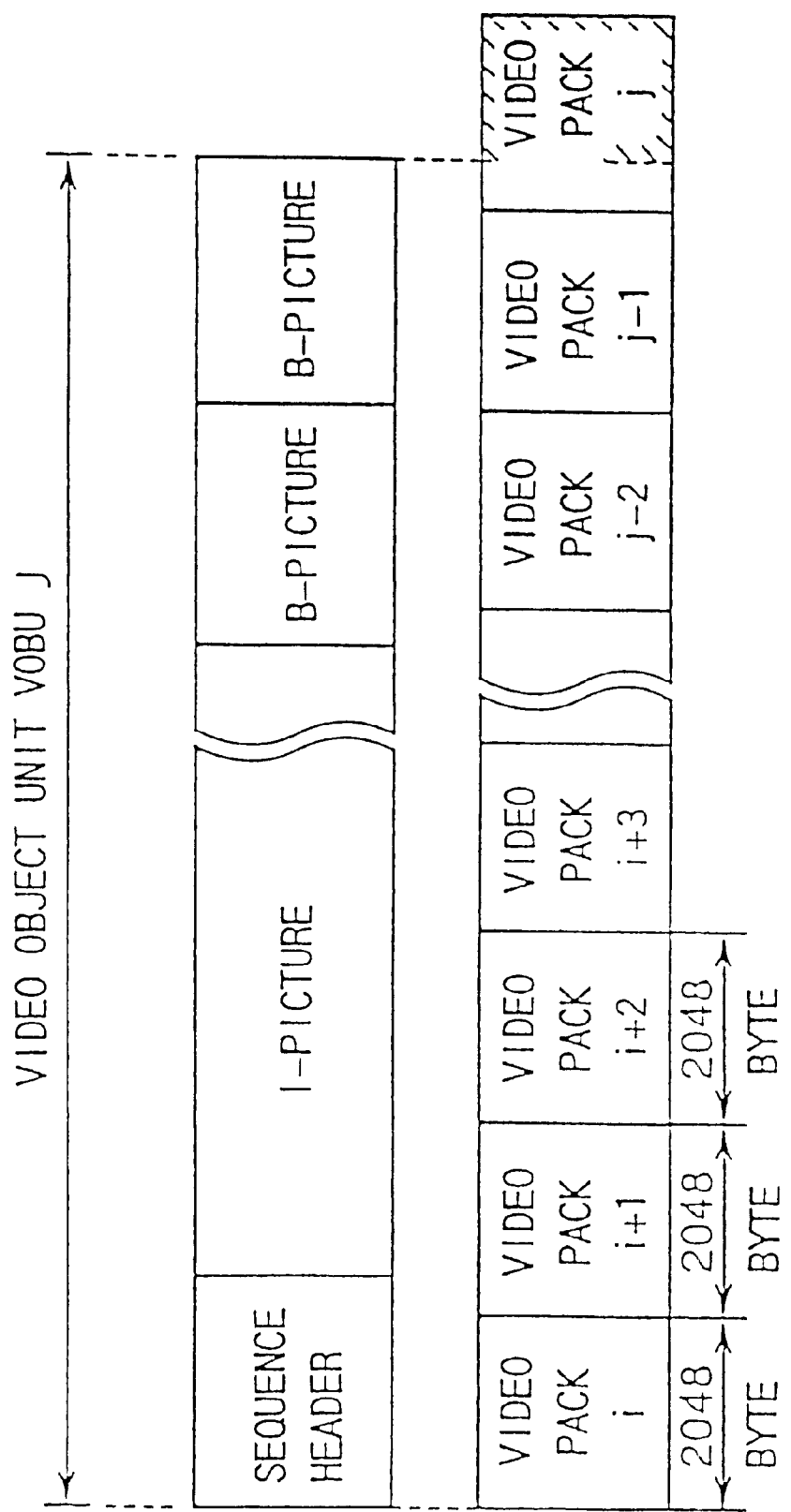
FIG. 7 shows a relationship between a video object unit and video packs in the unit.

FIG. 7 shows a relationship between a video object unit (VOBU) and video packs in it. Video data in VOBU comprises one or more GOPs (GOP=Group Of Pictures). Encoded video data conforms to MPEG2 (ISO/IEC13818-2) by way of example. The GOP in VOBU comprises an I-picture P- and B-pictures and the continuation of this data is divided into video packs. Next, a description is given of a data unit when multi-angle information is recorded and reproduced. When multiple scenes that differ in point of view for a subject are recorded on an optical disk, an interleaved-block portion is built on recording tracks to perform seamless playback. In the interleaved block portion, multiple video objects (VOB) that differ in angle are each divided into multiple interleaved units. The interleaved units are recorded in such an arrangement as allows seamless playback. Multiple stories may be interleaved on a kind of time division basis. In the description, all of the divided blocks were termed cells. Next, a description will be given of the interleaved units and management information used for playing back the interleaved units.

FIG. 8 shows video title set information (VTSI) in video title set (VTS). A video title set program chain information table (VTS_PGCIT) is described in the video title set information (VTSI). Thus, when a video object set (VOBS) in one video title set (VTS) is played back, a program chain is utilized which is specified by the producer or selected by the user from multiple program chains presented in the video title set program chain information table (VTS_PGCIT). In the VTSI, the following data are further described. VTSI_MAT is a video title set information management table, in which what kinds of information are present in this video title set and the starting and ending addresses of each item of information are described. VTS_PTT_SRPT is a video title set part-of-title search pointer table, in which entry points of titles and the like are described. VTSM_PGCI_UT is a video title set menu program chain information unit table, in which a menu of video title sets is described in various languages. Thus, the menu allows the user to determine what kind of video title set is described and what style of order playback can be performed in. VTS_TMAPT is a video title set time map table, in which information on the recorded position of each VOBU is described which is managed within each program chain and indicated at regular intervals of seconds. VTSM_C_ADT is a video tile set menu cell address table, in which the starting and ending address of each cell comprising the video title set menu and the like are described. VTSM_VOBU_ADMAP is a video title set menu video object unit address map, in which the starting addresses of menu video object units are described. VTS_C_ADT is a video title set cell address table, in which cell address information is described. When a program chain is selected in the playback apparatus, the order of playing back cells is set by that chain. In playback, NV_PCK included in the video object unit is referred to. NV_PCK has information for controlling display contents and display timing and information for data search. Thus, the retrieval and decoding of V_PCK are performed on the basis of information in the NV_PCK table. In addition, another pack is retrieved and decoded, in which case A_PCK and SP_PCK in a language specified by the producer or user are retrieved.

Figure 9:
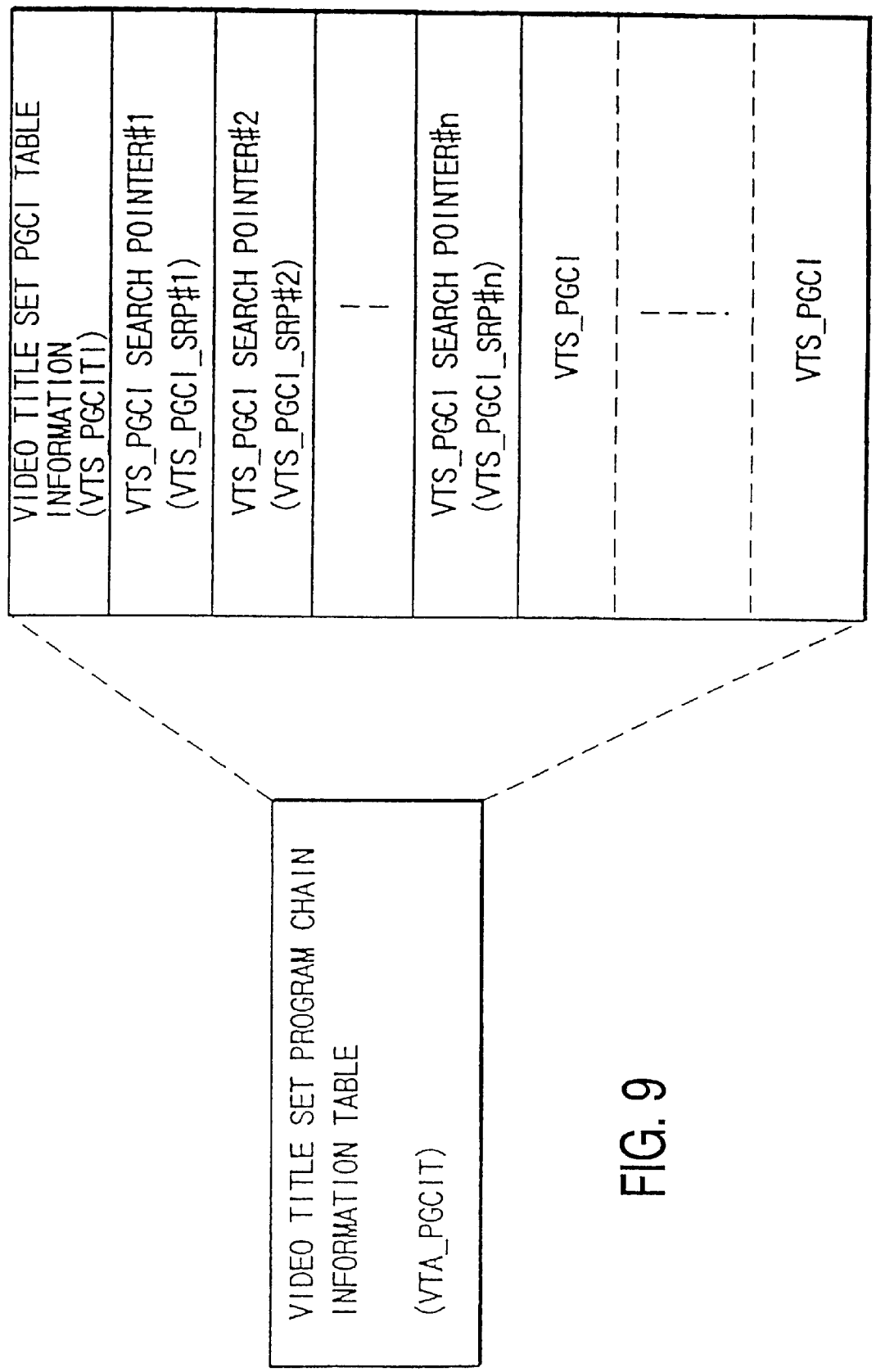
FIG. 9 shows the contents of a video title set program chain information table.

FIG. 9 shows the contents of the video title set program chain information table (VTS_PGCIT). In this table are described video title set PGCI table information (VTS_PGCITI), search pointers (VTS_PGCI_SRP#1 to #n) for video title set program chain information, and specific program chain information (VTS_PGCI). In (VTS_PGCITI) are described the number of search pointers and the ending address of this table. In (VTS_PGCI_SRP#1 to #n) are described, as the category of the video tile set program chain, the number of titles in a video title set that becomes a target, whether the program chain ends with one block or continues into a chain in another block, etc. In addition, the starting address of the video title set program chain is described in terms of the relative address to the starting position of this table.

FIG. 10 describes the contents of program chain information (PGCI). The PGCI contains program chain general information (PGCI_GI), a program chain command table (PGC_CMDT), a program chain program map (PGC_PGMAP), cell playback information (C_PBI), and cell position information table (C_POSIT). In the PGCI_GI are described the number of programs and the number of cells for this program chain (this information is called PGC contents (PGC_CNT)). In addition, all the playback times that the program chain intends are shown (this information is called PGC playback time (PGC_PB_TM)). Moreover, a code of whether a program played back by this program chain allows user operation, for example, whether the switching of angles is possible, is described (this information is called PGC user operation control (PGC_UPR_CTL)). Furthermore, codes of whether audio streams can be switched and what type of audio stream (e.g. linear PCM, AC-3, MPEG or the like) can be switched into are also described (this information is called PFC audio stream control table (PGC_AST_CTLI). In addition, codes of whether subvideos can be switched and what type of subvideo (e.g., a different aspect ratio) can be switched into are described (this information is called PGC subvideo stream control table (PGC_SPST_CTLT). Moreover, in this PGCI_GI, the next program chain number and the previous program chain number are also described. Furthermore, whether the program intended by this program chain is intended for continuous playback, random playback, or shuffle playback is also described (this information called PGC navigation control (PGC_NV_CTL). In addition, color specification is performed to indicate what colors subvideo is to be displayed in (this information is called PGC subvideo palette (PGC_SP_PLI)). Also, the starting address of the program chain command table (PGC_CMDT_SA), the starting address of the program chain program map (PGC_PGMAP_SA), the starting address of the cell playback information table (C_PBIT_SA) and the starting address of cell position information (C_POSI_SA) are described. In the program chain command table are described the pre-commands and post-commands of the program chain and cell commands. The pre-commands are ones to be processed prior to the execution of the program chain and the post-commands are ones to be processed after the execution of the program chain. The pre-commands and post-commands are used to define the video title, the reproduced state of audio, and the reproduced stream on the basis of commands or parameters decided in advance on the player side or the disk producer side. The cell commands are ones to be processed subsequent to the execution of playback processing of cells. In the starting address of the program chain program map (PGC_PGMAP), the structure of a program for which the program chain is intended is indicated and entry cell numbers of an existing program are described. In the cell playback information table (C_PBIT)

is described information indicating the order of playing back cells for which the program chain is intended.

Figure 11:
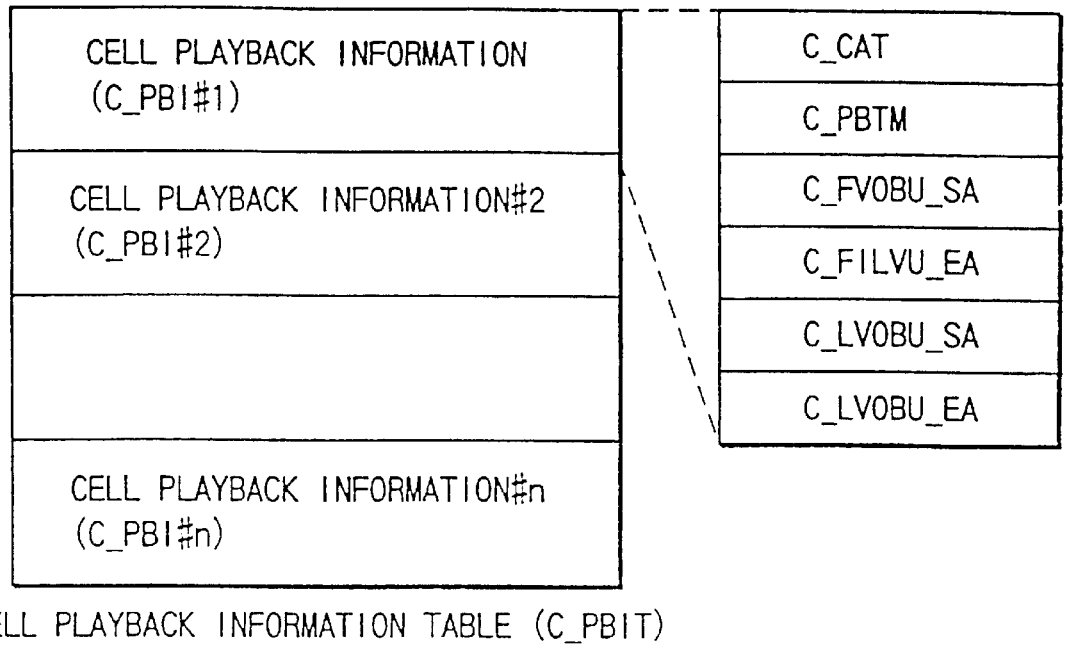
FIG. 11 shows cell playback information and the contents thereof.

FIG. 11 shows cell playback information (C_PBIT) and its contents. The C_CAT is cell attribute information and indicates the mode of a cell block. The mode of a cell block indicates whether the cell is the first one or the last one. Also included are information as to whether seamless playback is to be performed, information as to whether the cell block is among interleaved blocks, and information about seamless angle switching. The information about seamless angle switching indicates that the angle switching can be made either seamlessly or non-seamlessly. C_PBTM indicates the cell playback time, C_FVOBU_SA the starting address of the first video object unit (VOBU) of the cell, C_ILVU_EA the ending address of the first interleaved unit (ILVU) of the cell, C_FVOBU_SA the starting address of the last video object unit (VOBU) of the cell, and C_FVOBU_EA the ending address of the last video object unit (VOBU) of the cell. The addresses are described in terms of logical block numbers relative to the first logical block of VOB to which the cell belongs. By referring to the cell playback information, a determination can be made of whether the current playback state reaches the end of a cell. When the next cell is played back the next cell playback information in the cell playback information table is referred to determine the starting address of the first VOBU of the next cell (or interleaved unit).

Figure 12:
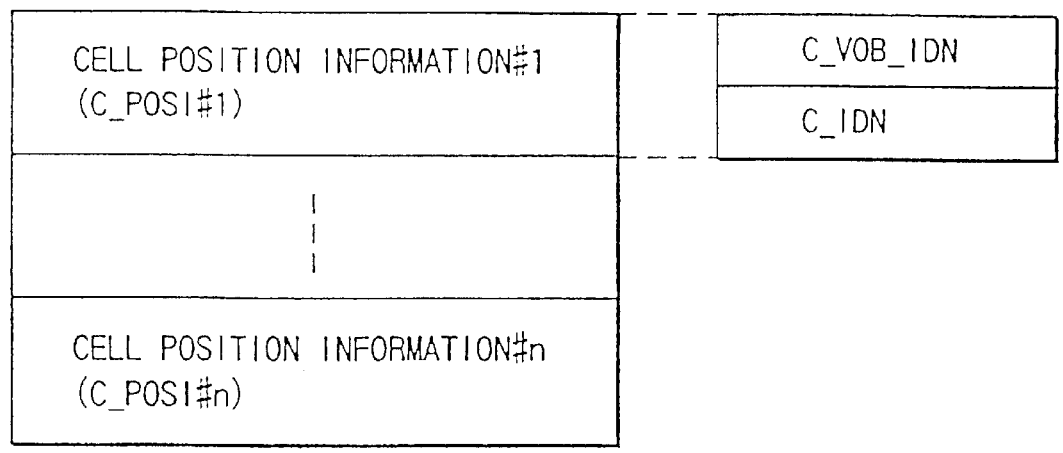
FIG. 12 shows the contents of a cell position information table.

FIG. 12 shows the contents of the cell position information table (C_PSIT). The cell position information includes the ID number of a video object (C_VOB_IDN) in which the cell is contained and the cell ID number (C_IDN) of the cell. As described above, the management information describes cell playback information, in which there is cell attribute information indicating whether interleaved units for multiple angles or the like have been recorded. When a multi-angle video or a multi-story video is recorded, the playback apparatus needs to switch from the angle being played back to the other or switch from the story being played back to the other according to user's operation. In this case, the playback apparatus responds to the user's operation on the basis of the following information. First, the structure of a pack will be described.

Figure 13:
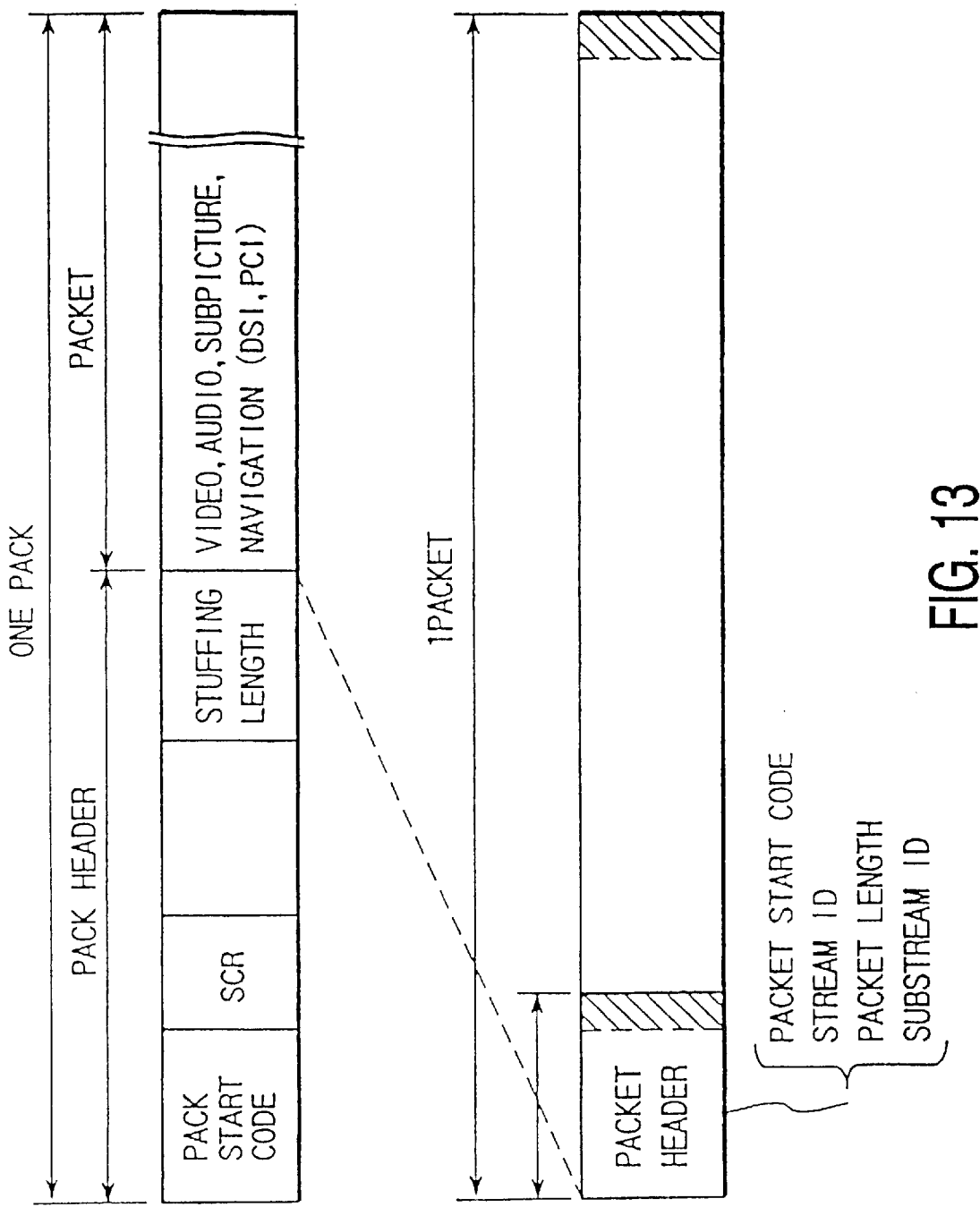
FIG. 13 shows the formats of a pack and a packet recorded on an optical disk.

FIG. 13 shows the formats of one pack and one packet. One pack comprises a pack header and a packet. In the packet header are described a pack start code, a system clock reference (SCR), etc. The pack start code is one indicating the beginning of the pack, and the system clock reference (SCR) is information indicating to the entire playback apparatus the reference time in the playback elapsed time. One pack is defined and recorded as one logical block on an optical disk. One packet comprises a packet header and video data or audio data or subpicture data, or navigation data. Stuffing may be provided in the packet header. Padding may be provided in the data division of the packet.

Figure 14:
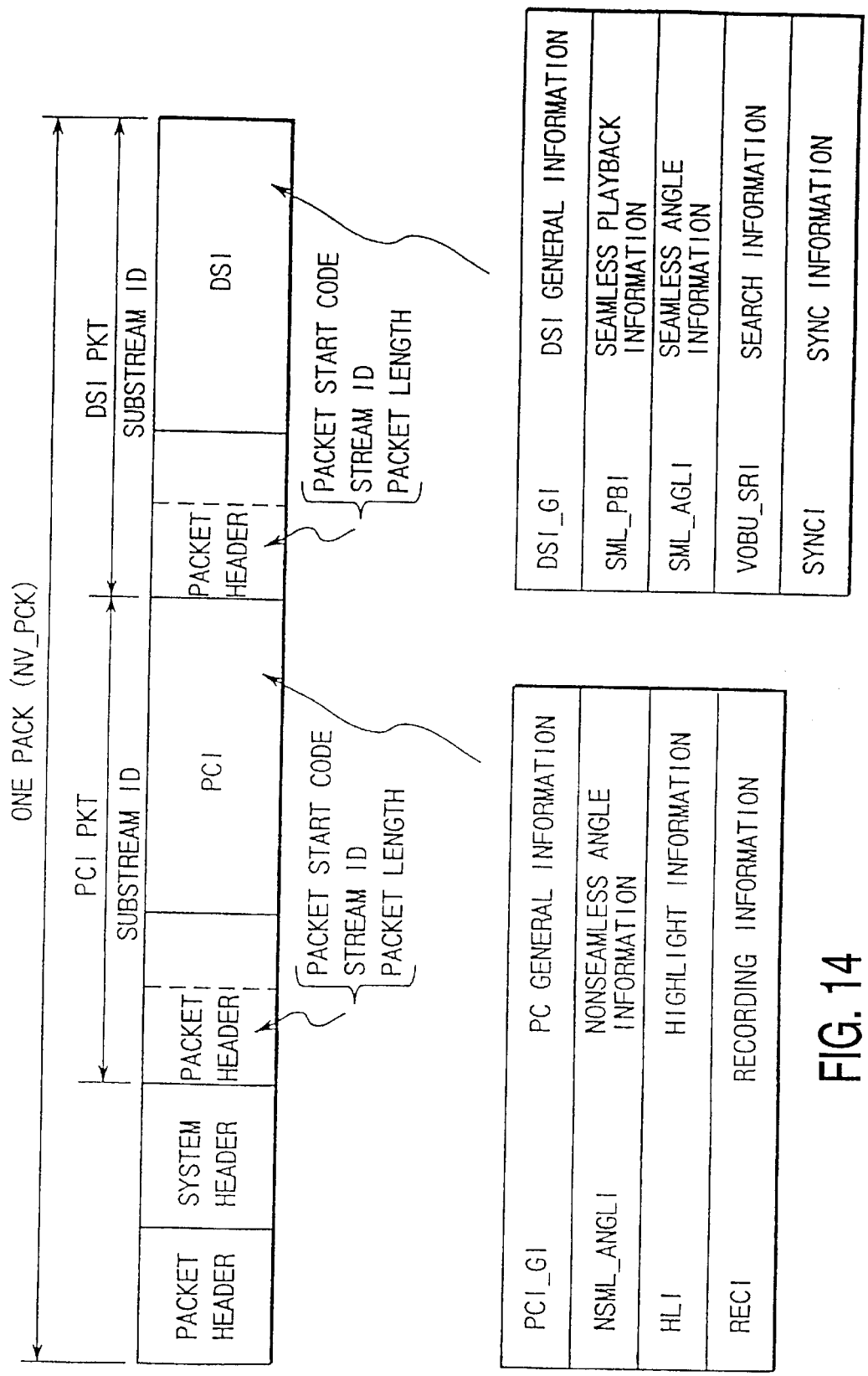
FIG. 14 shows an NV_PCK pack.

FIG. 14 shows the NV_PCK (see FIG. 5). The NV_PCK includes a picture control information (PCI) packet basically adapted to control display pictures and a data search information (DSI) packet existing in the same video object. In each packet are described a pack header and a substream ID, followed by data. In each pack header is described a stream ID, indicating NV_PCK. The substream ID is used to distinguish between PCI and DSI. In each pack header are described a packet start code, a stream ID and the packet length, followed by data. The PCI packet is navigation data for changing display contents synchronously with the playback of video data in a video object unit (VOBU) to which the NV packet belongs. In the PCI packet are described PCI general information (PCI_GI) that is general information, non-seamless angle information (NSML_ANGLI), highlight information (HLI) and recording information (RECI) that is recorded information. In the PCI_GI is described PCI general information, which includes: the logical block number (NV_PCK_LBN) that is the address of the navigation pack, the video object unit category (VOBU_CAT) indicating the attribute of a video object unit (VOBU) managed by the PCI, the user operation control (VOBU_UPO_CTL) that is user operation inhibit information in the display period of the video object unit managed by the PCI, the video object unit display starting time (VOBU_S_PTM), and the video object unit display ending time (VOBU_E_PTM). The first picture specified by the VOBU_S_PTM is an I-picture in the MPEG standards. Further, video object unit sequence end presentation time (VOBU_SE_E_PTM) indicating the display time of the last video in the video object unit, the cell elapsed time (C_ELTM) indicating the display elapsed time relative to the first video frame in a cell and so on are also described. The NSML_ANGL indicates the destination address when an angle change is made. That is, the video object unit includes pictures shot from different angles. The address of a VOBU is described to which a transition is made for the next playback when the display of pictures shot from a different angle from the current one is specified by the user. The HLI is information for specifying a specific rectangular area on the screen and changing the brightness of that area or the color of subvideo displayed therein. The information includes highlight general information (HL_GI), a button color information table (BTN_COLIT) used when the user makes a selection among buttons for color selection, and button information table (BTNIT) for select buttons. The RECI is information about video, audio and subpicture recorded in the video object unit, each item of information describing what data to be decoded is like. For example, a country code, a copyright owner code and the date of recording are included. The DSI packet is navigation data for making a search for a video object unit. In the DSI packet are described DSI general information (DSI_GI), seamless playback information (SML_PBI), seamless angle information (SML_AGLI), video object unit search information (VOBU_SRI), and sync information (SYNCI).

As shown in FIG. 15, in the DSI_GI is described the following information: a system clock reference indicating the reference time for starting decoding the NV_PCK (NV_PCK_SCR), the logical address of the NV_PCK (NV_PCK_LBN), the ending address of the video object unit to which the NV_PCK belongs (VOBU_EA), the ending address of the first reference picture (I-picture) to be decoded first (VOBU-1STREF_EA), the ending address of the second reference picture (I or P-picture) to be decoded first (VOBU-2NDREF_EA), the ending address of the third reference picture (I or P-picture) to be decoded first (VOBU_3RDREF_EA), the ID number of the VOB to which the DSI belongs (VOBU_VOB_IDN), the ID number of the cell to which the DSI belongs (VOBU_C_IDN), and the cell elapsed time indicating the elapsed time relative to the first video frame in the cell (C_ELTM).

As shown in FIG. 16, in the SML_PBI is described the following information: video object unit seamless category indicating whether the VOBU to which the DSI belongs is an interleaved unit (ILVU) or a pre-unit (PREU) that is the criterion for indicating the connection between video objects, the ending address of the interleaved unit (ILVU_EA), the starting address of the next interleaved unit (ILVU_SA), the size of the next interleaved unit (ILVU_

SZ), the video display starting time in the video object (VOB) (VOB_V_S_PTM), the video display ending time in the video object (VOB) (VOB_V_E_PTM), the audio stopping time in the video object (VOB) (VOB_A_STP_PTM), and the audio gap length in the video object (VOB) (VOB_A_GAP_LEN). The pre-unit (PREU) is the last unit immediately before the interleaved unit. In the video object unit seamless, category (VOBU_SML_CAT) are further described a flag indicating whether or not the interleaved unit is one at the starting time and a flag indicating whether the interleaved unit is one at the ending time.

FIG. 17 shows the contents of the seamless angle information (SML_GLI). C1 to C9 indicate the number of angles. Even if a maximum of nine angles exists, the addresses and sizes of their destination interleaved units can be indicated. That is, the addresses and sizes (SML_ADL_Cn_DSTA) (n=1 to 9) of interleaved units that are destinations for the respective angles are described. When the user performs an operation of changing the angle while watching video, this operation information is referenced to, thereby allowing the playback apparatus to recognize the playback position of the next interleaved unit.

FIG. 18 shows VOBU search information (VOBU_SRI) which is referenced to at the time of special playback, etc. The information describes the starting addresses of VOBUs (0.5×n) seconds before and after the starting time of the current video object unit (VOBU). That is, the starting address of each of +1, +20, +60, +120 and +240 VOBUs as forward addresses (FWDIn) and a flag that a video pack is present in the unit are described according to the order of playback with the VOBU containing the DSI being referenced to. The starting address is described in terms of the number of logical sectors relative to the leading logical sector in the VOBU.

FIG. 19 shows sync information. In this sync information are described the address of an object audio pack to be synchronized and the VOBU starting address of an object video pack to be synchronized.

The above-described management information is described on an optical disk The system controller of the playback system makes a reference to the program chain information in the video manager to thereby acquire cell playback information. By referring to the cell attribute information, whether interleaved unit blocks for multiple angles have been recorded is recognized. When the interleaved unit blocks have been recorded, seamless playback information and seamless angle information in the NV_PCK are acquired and stored in the buffer memory in the middle of playback. When angle switching information is entered by the user, the seamless angle information is referenced to, whereby the playback of interleaved units for the angle specified by the user is started. Then, reference is made to the seamless cell playback information contained in the acquired NV_PCK to recognize the interleaved unit to be played back next. By referencing to the cell playback information, a decision can be made as to whether it is the end of a cell that is currently played back. To play back the next cell, reference is made to the next cell playback information in the cell playback information table to determine the starting address of the first VOBU of the next cell.

According to the invention the control unit 20 of the recording device as shown in FIG. 2 is arranged for recording real-time information according to the following method.

Figure 20:
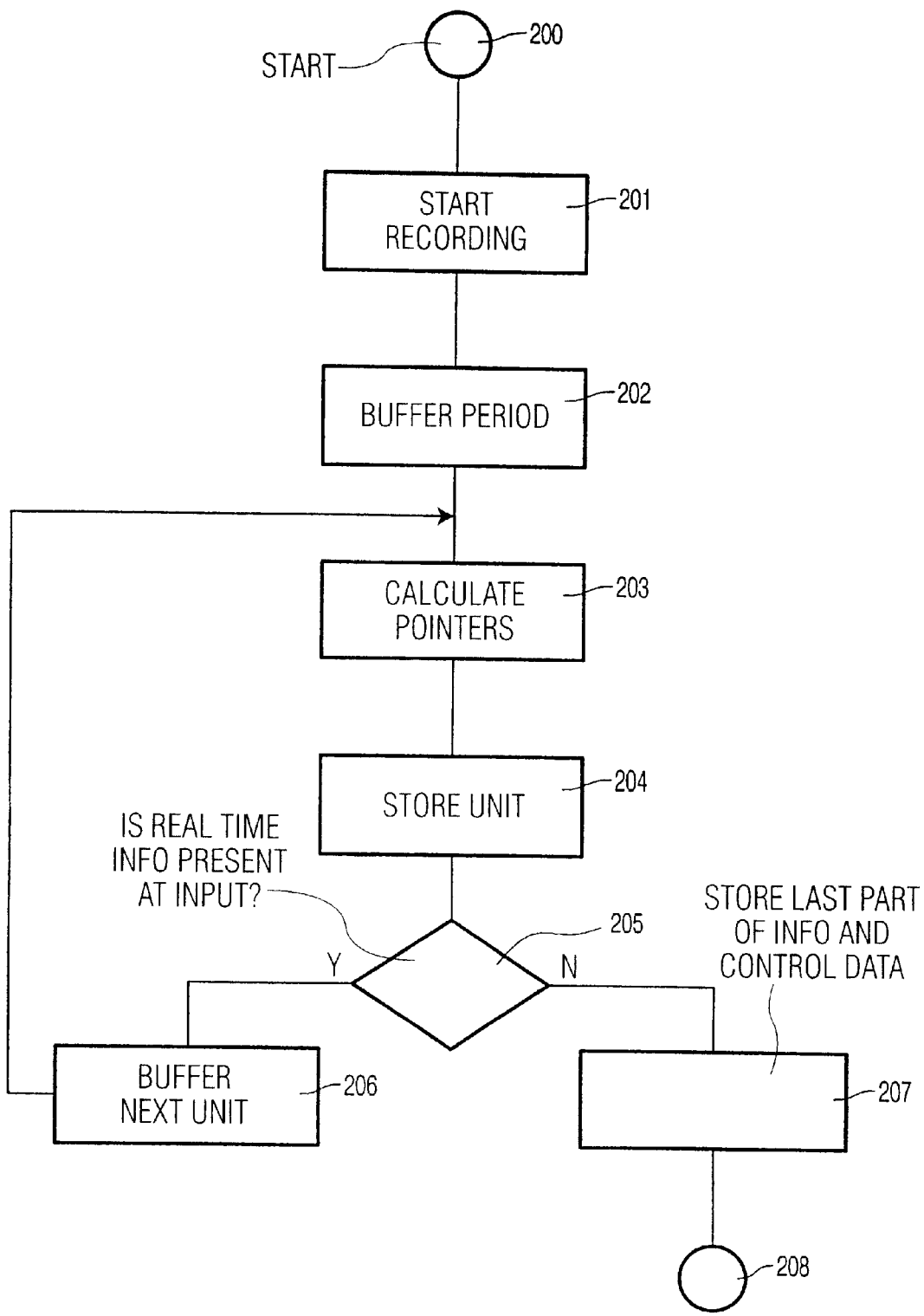
FIG. 20 shows the recording method according to the invention.

FIG. 20 shows a real-time recording method for recording real-time information according to a recording format. For the below example the DVD-video format as described above, is used. It is to be noted, that the DVD format comprises units of data, the above describe VOBUs, which comprise the real-time information and playback parameters. A recording session starts at a start 200, e.g. by a user command, and is completed at stop 208, e.g. when a programmed recording is completed. In a first step 201 (START RECORDING), provided a record carrier is inserted in the recording device, the input of real-time information is started. In a second step 202 (BUFFER PERIOD) the first period of real-time information comprising a number of units is stored in a (relatively small) buffer, e.g. VOBUs for a few seconds of video. In a third step 203 (CALCULATE POINTERS) pointer values which are required in the first unit (VOBU) are determined from the stored data in the buffer, and in further processing loops also the pointers for past VOBUs are determined, e.g. by storing addresses in a memory in the control unit 20. In particular pointers for units not yet available in the buffer are substituted by calculated values, which deviate from the values prescribed in the recording format. The calculation is given below. In a fourth step 204 (STORE UNIT) the completed real-time information and playback parameters are recorded on the record carrier. In a test 205 it is determined, if more real-time information is present at the input. If so, in a next step 206 (BUFFER NEXT UNIT) the next amount of real-time information is buffered, at the same time removing the already stored first unit. The last four steps 203, 204, 205 and 206 are repeated until the recording is finished, which is tested by said test 205. If finished, the last part of the buffered information and remaining control data is stored in step 207. Said calculation for forward references is described below and is performed by a multiplexer function within the control unit 20 in cooperation with the formatting unit 28, constituting part of said processing means.

It is the task of the multiplexer to parse and multiplex the input elementary stream (audio, video and sub pictures) into a VOB comprising VOBUs. The types of packs in the VOBU may be seen as packs containing dynamic navigation data and packs containing presentation data (Video Packs, Audio Packs). A VOBU starts with exactly one navigation pack and is followed by a number of packs containing presentation data. A VOBU represents a presentation time of 0.4 seconds to 1 second. The multiplexer must calculate and add the dynamic navigation data i.e. it must create a navigation pack (NV_PCK) as the first sector of each VOBU. The navigation pack contains the Presentation Control Information (PCI) and the Data Search Information (DSI). That is, it contains information about search information and how the presentation data should be presented e.g. highlight information, seamless information, locations. Hence, the DSI and PCI is dispersed throughout the Presentation Data of the VOBS. PCI is the navigation data to control the VOBU. DSI is the navigation data to carry out seamless playback of the VOBU i.e. fast forward, fast backwards, slow motion. There are three forward references i.e. a field containing data that requires location information outside the VOBU (in the forward direction): DSI/VOBU_SRI (FWDx), DSI/SML SML_PBI (VOB_V_E_PTM) and DSI/SYNCI (A_PCKA 0). The assigning of values to the various fields of the NAV_PCK structures is given below with special reference to forward referencing.

In the General Information (PCI_GI) three forward references outside a PES packet exist. They are not forward references within the VOBU.

VOBU_S_PTM: Presentation Start Time of the video data in the VOBU. Since a GOP is VOBU aligned, this address is within the VOBU. If there is no video data in VOBU then the presentation start of imaginary video data is described.

VOBU_E_PTM: Presentation End Time of the video data in the VOBU. By definition this is an address within a VOBU VOBU_SE_E_PTM: Presentation time of sequence_end_code of the video data in VOBU. By definition this is an address within a VOBU In addition C_ELTM: a backward reference (requiring cell start time).

In Angle Information for non seamless (NSML_AGLI) no forward references exist. When the angle block does not exist, the related (36) bytes can be zero. Also in the Highlight Information (HLI) no forward references exist. These 22 bytes are set to zero. The logic is: HLI_SS is set to 00 since valid HLI is non existence (no sub pictures). If HLI_SS is zero then the rest of the structure is to be invalid. Further in Recording Information (RECI) no forward references exist. The only valid fields are ISRC_V and ISRC_A0, because we are dealing with 1 audio stream (stream 0) and 1 video stream. All other fields are zero. The ISRC contains country code, copyright holder content, recording year and recording number information. These may be set to zero, or they are candidates for hard-coded or user defined information. For Angle Information for seamless (SML_AGLI), since angle blocks do not exist, there are 54 bytes of zero.

In Seamless Playback Information (SML_PBI), when a VOBU is not part of an ILVU, 2 forward reference exists. One is outside the VOBU i.e. the VOB_V_E_PTM. The remainder of the fields are filled as zero. VOB_V_S_PTM describes the presentation time of the first GOP in VOB. Every VOBU of the VOB has the same value. So only forward for the first VOBU of the VOB. VOB_V_E_PTM describes the terminating presentation time of the last video frame of the last GOP. The VOB_V_E_PTM for a VOB is fixed for all VOBUs in that VOB. The use of the forward pointer VOB_V_E_PTM is described below.

The field is used when a VOB boundary is approached.

A new VOB is detected by an SCR of zero.

When PTS=VOB_V_E_PTM of cell N, then PTS becomes VOB_V_S_PTM to play (seamlessly) cell N+1. That is, there is a discontinuity in the PTSs.

The VOB_V_E_PTM is used to inform the hardware clock and all decoders (audio, video, sub-picture) at what moment, the clock is reset to the VOB_V_S_PTM of the next VOB. A practical situation is a sequence of 3 VOBs, in which due to parental control, the second VOB must be skipped, and the 1 st and 3rd must still be played seamlessly. There is a problem with the PTSes because the end PTS of VOB-1 can not be the same as the start PTS of VOB-3. As a solution, each VOB has its own PTS domain, and that starts with zero. Well, in fact, the SCR of each VOB starts exactly with zero, and the start PTS is a value slightly higher than zero. Consider the SCR as DTS time, so that there must be some delay for presentation at time PTS. In the recording process the VOB_V_F_PTM is calculated to a fixed value, which may be an arbitrary value, which gives some deviations in the playing time control system just described. In an embodiment the playing time of the VOB is set to a fixed value and deviations are limited by starting a new VOB when the current VOB has the fixed length. For example the fixed length for the VOB can be one minute, and the same time can be used for a fixed size Cell length. As the fixed length is known the correct value for the forward pointer VOB_V_E_PTM can be inserted, because it can be directly calculated from said fixed size. Summarizing VOB_V_E_PTM can be solved by: fixing the size of a VOB (in terms of bytes), or alternatively filling in a default time, i.e. no fully correct playing time display for the user.

The VOBU Search Information (VOBU_SRI) is the structure that concerns forward references the most. All fields give information of data outside the VOBU. The structure describes the start address of VOBUs presented 0.5 *n second in the forward and backward direction as shown in FIG. 18. However the pointers do not go outside the cell boundary. If a VOBU does not exist then a value of 3F FF FF FF is filled in to indicate that the VOBU does not exist in this place. The VOBU_SRI/FWDx table may be used for 3 main purposes in the player: Fast forward, e.g. 2 fast forward modes (2 and 8) and/or also 32 speed, Error recovery, e.g. a player may use FWD_VIDEO, FWD_3, and FWD_10 when recovering an error in forward direction (a degradation may occur when FWD_10 is not filled in), and time search, which is performed in a repeat mode wherein the player searches for the VOBU with the indicated time using the forward references. Suppose a cell is 120 seconds and the maximum reference to the next VOBU is 3 seconds, then finding the required VOBU costs on average 20 disc accesses and worst case 39 disc accesses. This costs a lot of time for the user, assuming a speed of 4 disc accesses per second. In an embodiment of a player a better strategy would be to start searching at the end of a cell, and exploiting the backward references that have been filled in correctly. The usage of FWDI_VIDEO is as follows: time-search check for next VOBU with video, fast forward check for next VOBU with video, check if video is available in some next VOBU of the cell, robustness check if cell has video at all, or error recovery: VOBU candidate. The Usage of FWDI_NEXT is testing if VOBU is last in cell The FWDI_VIDEO are determined for nearby VOBUs by referring to the contents of the buffer 30, and are calculated for more distant VOBUs by assuming said VOB size. Summarizing, the Forward References (outside VOBU) in the DSI of the Navigation Pack are FWDIx (DSI/VOBU_SRI) are filled in as follows. Set the fields outside the buffer size to 3F FF FF FF. Alternatively the fields to outside the buffer size may be set to the last valid VOBU known. In an embodiment, after the first N FWDI pointers which are correctly filled in based on the video information in the buffer, the next M FWDI pointers are identical to the latest correct one. Thereafter the remaining FWDI pointers indicate the end of the Cell. In an embodiment also the backward pointers in the VOBU search information are adapted similarly to the calculation of the forward pointers. Now a players will behave symmetric, i.e. will have the same deviating behavior for in fast forward and fast backward reproduction.

Other Alternatives Are:

Fixing the duration of a VOBU to say 0.5 seconds to ensure that the FWDIx pointers could be calculated (by extrapolation) during the first pass of recording.

Use small cells (fitting in buffer 30). Since these forward references are not valid outside the cell then using very small cells, they no longer become problems.

The Synchronous Information (SYNCI) is the address information of the audio data and sub picture data presented synchronously with the video data of the VOBU. Since we are not dealing with sub pictures and only one audio then A_SYNCA 0 is the only field that must be filled in. Zero is filled in for all other fields. Two pieces of information are needed for the A_SYNCA 0 field: A_PCK location is set to 0 if after this NV_PCK or 1 if before, and A_PCKA states how many sectors before or after the NAV_PACK its target is. Obviously, A_PCKA is indeed a forward reference. It represents the "skew" between the audio and video. The maximum number of VOBUs AFTER the video can an audio pack occur is 5, assuming VOBU is 0.4 seconds (minimum size). A_PCKA can refer to as far ahead as VOB+3. The maximum delay between Audio and Video is 5. The maximum demultiplex buffer delay of an audio frame, in bytes, is the audio buffer size. The maximum buffer delay can be expressed as 4096 bytes, 21.3 frames or 0.512 seconds. As the maximum total is 5 VOBUs, the recorder according to the invention is preferably equipped with a buffer 30 large enough to contain at least 5 VOBUs, which enables the forward references to be determined from the real-time data within the buffer, which in practice requires around 3 Mbytes. Further the allowed amount of "skew" between an audio or video (currently it is −0.5 s to +1 s), may be limited to −0.5 s to 0.8 s, which gives a smaller required buffer. Ultimately ensuring the size of a VOBU may be sufficient, if amount of allowable "skew" is maximum 1 VOBU. Alternatively a default value may be filled in, indicative that no pointer is available.

Further the functions for creating VOB, CELL AND VOBU are discussed showing the consequences for the multiplexer. The Multiplexer constructs one VOB per execution. A VOBS consists of one or more VOBs. For this application the VOBs are placed consecutively in a VOBS. A VOB is (approximately) a Program Stream. The differences are, that it is not terminated by an MPEG_program_stream_end_code, but still it has to start with a zero SCR. The maximum number of VOBs in a VOBS is 65535. When more than one VOB is placed in a VOBS then we must consider "seamless play of VOBs". The DVD Standard states that Video Streams and Audio Streams must be completed within the VOB. The definition of completed is, that the beginning of each stream shall start from the first data of each access unit, and the end of each stream shall be aligned in each access unit. This matters because it means that the audio and video decoding buffer delay is restricted at this point.

When two VOBs, each in one contiguous block, are placed consecutively in a VOBS then an audio gap may occur between the two VOBs if the video stream of the first VOB is longer than it's audio stream. The audio gap is seen as a non seamless feature. To ensure seamless play, in this case, the audio gap should be removed so that the audio streams also join i.e. lip synchronization. As an example the audio of VOB1 is somewhat shorter than the video. VOB1 contains a video stream and an audio stream, VOB2 contains also a video stream and an audio stream, and VOB1 audio is 40 ticks shorter than it's video counterpart. The Multiplexer deals with such situation as follows. An audio gap would exist if we started the audio stream of VOB2 at the same time as the video of VOB2, i.e. non-seamless. The removal of the audio gap is obtained by moving the audio stream 40 ticks earlier than the video. This is equivalent to saying that the encoding should have been 40 ticks earlier to ensure lip synchronization. The audio gap is not moved to hide the gap. The gap is there. In an embodiment of the process it is moved to a more convenient place, e.g. at a scene change. It cannot just be ignored, as after a number of gaps it would accumulate and eventually have a lip sync problem.

For adding, deleting and moving VOBs, from a presentation data point of view, the following applies. The process of appending a VOB to the end of a VOB means that the existing VOBs are not affected. The process of removing a VOB within a VOBS implies that re-numbering of VOB id after the VOB must be performed. The process of inserting a VOB boundary within a VOB is not a feasible option. For the Cell Boundary the following applies. A Cell is an integral number of VOBUs. The minimum size of a cell is 1 VOBU and hence 0.4 seconds. The maximum size of a cell is the size of the VOBS i.e. minimal one cell. A Cell is not necessarily self contained i.e. does not necessarily contains all audio associated with its video. A cell begins with a GOP i.e. video data, so the cell must start at a GOP boundary i.e. cell boundaries are at the start of a GOP. Cells have very little affect on the generation of a Program Stream. Cell information is found within the Navigation Pack of a VOBU, as follows:

The Cell ID (1 byte) and VOB Id (2 Bytes) uniquely define a cell within a VOBS. These are found in the DSI_GI of a Navigation Pack. Therefore the maximum number of Cells per VOB is 255.

C_ELTM (of PCI_GI and DSI_GI within a Navigation pack): elapsed time of a cell.

Note that the VOBU Search Information (VOBU_SRI) does not reference outside the Cell. That is the structure that references VOBUs up to 120 seconds ahead and 120 seconds behind. The Cell ID starts at 1 and must increment by 1 within a VOB i.e. must be consecutive.

Although the invention has been explained by embodiments using the DVD-video format, it may be applied for any format for real-time data requiring non-causal control data to be written multiplexed within the real-time data itself. Further, the scope of the invention is not limited to the embodiments, and the invention lies in each and every novel feature or combination of features described above. It is noted, that the invention may be implemented by means of hardware and/or software, and that in this document the word 'comprising' does not exclude the presence of other elements or steps than those listed and the word 'a' or 'an' preceding an element does not exclude the presence of a plurality of such elements, that any reference signs do not limit the scope of the claims, that 'means' may be represented by a single item or a plurality and that several 'means' may be represented by the same item of hardware.

What is claimed is:

1. A real time information signal, produced by a method comprising:
    receiving a real time information signal subdivided into units;
    buffering the units of the real time information in a buffer as they are received until they are transmitted;
    for a first unit contained in the buffer, calculating the value of a forward pointer, the value being information used for determining the position of a second unit on a record carrier forward from the position of the first unit on the record carrier, the calculated value of the pointer being based on the buffered real time information and/or a predefined value, the value of the pointer being calculated before the second unit is received;
    inserting the forward pointer with the calculated value into the first unit; and
    transmitting the real time information signal including the first unit containing the pointer.

2. The signal of claim 1, wherein the value of the forward pointer is indicative of the position on the record carrier of the second unit.

3. The signal of claim 2, wherein the indicated position is with respect to a position of the first unit on the record carrier.

4. The signal of claim 1, wherein the value of the forward pointer is indicative of the position on the record carrier of the last unit in the buffer when the value of the pointer is calculated.

5. The signal of claim 1, wherein the value of the forward pointer is indicative that the second unit has not yet been received when the value of the pointer was calculated.

6. The signal of claim 1, wherein the value of the forward pointer is a predefined value indicative of the non-existence of the second unit.

7. The signal of claim 1, wherein multiple recorded units each contain multiple respective forward pointers including forward speed pointer to units at predefined amounts of time forward for reproducing sequences of the units at different speeds higher than real time.

8. The signal of claim 7, wherein the first units also contain multiple backward speed pointers to respective second units located at predefined amounts of time backward on the record carrier, for reverse reproducing sequences of the units at different speeds.

9. The signal of claim 7, wherein the forward pointers include pointers with values indicating positions of second units that were received before the respective first units were recorded, and pointers with values indicating estimates of positions of second units that were received after the estimates were calculated.

10. The signal of claim 1, wherein a format of the record carrier is the DVD format.

11. A method of transmitting real time information, comprising:

receiving a real time information signal subdivided into units;

buffering the units of the real time information in a buffer as they are received until they are transmitted;

for a first unit contained in the buffer, calculating the value of a forward pointer, the value being information used for determining the position of a second unit on a record carrier forward from the position of the first unit on the record carrier, the calculated value of the pointer being based on the buffered real time information and/or a predefined value, the value of the forward pointer being calculated before the second unit is provided;

inserting the pointer with the calculated value into the first unit; and transmitting the real time information including the first unit containing the pointer.

12. A method of recording real time information on a record carrier, comprising:

receiving a real time information signal subdivided into units;

buffering the units of the real time information in a buffer as they are received until they are recorded;

for a first unit contained in the buffer, calculating the value of a forward pointer, the value being information used for determining the position of a second unit on the record carrier forward from the position of the first unit on the record carrier, the position of the second unit being at least partially independent of the time of the second unit, the calculated value of the forward pointer being based on the buffered real time information and/or a predefined value, the value of the pointer being calculated before the second unit is received;

inserting the forward pointer with the calculated value into the first unit; and recording the units of the real time information on a record carrier including the first unit containing the forward pointer.

13. The method of claim 12, wherein the value of the forward pointer is indicative of the position on the record carrier of the second unit.

14. The method of claim 13, wherein the indicated position is with respect to a position of the first unit on the record carrier.

15. The method of claim 12, wherein the value of the forward pointer is indicative of the position on the record carrier of the last unit in the buffer when the value of the pointer is calculated.

16. The method of claim 12, wherein the value of the forward pointer is indicative that the second unit has not yet been provided when the value of the pointer was calculated.

17. The method of claim 12, wherein the value is a predefined value indicative of the non-existence of the second unit.

18. The method of claim 12, wherein multiple recorded units each contain multiple respective forward pointers including forward speed pointer to units at predefined amounts of time forward for reproducing sequences of the units at different speeds higher than real time.

19. The method of claim 18, wherein the units also contain multiple backward speed pointers to units located at predefined amounts of time backward for reverse reproducing sequences of the units at different speeds.

20. The method of claim 18, wherein the forward pointers include pointers with values indicating a known positions of second units that were received before the respective first units were recorded, and pointers with values indicating estimates of positions of second units that were received after the respective first units were recorded.

21. The method of claim 12, wherein a format of the record carrier is the DVD format.

22. A method of playing recorded real time information, comprising:

reading a first unit of real time information from a record carrier;

determining whether the value of a pointer contained in the first unit, indicates that a second unit was available for determining its position when the first unit was recorded;

reading the second unit from the record carrier when the second unit was available for determining its position, when the first unit was recorded; and determining an estimate the position of the second unit depending on the value of the pointer and searching for the second unit at the estimated position, when it is determined that the pointer indicates that the second unit was not available to determine its position.

23. A player for recorded real time information, comprising:

means for reading units of real time information from a record carrier;

means for determining whether the value of a pointer contained in a first unit read from the record carrier indicates that a second unit was available for determining its position, when the first unit was recorded;

means for:

positioning reading means at the position of the second unit indicated by the pointer, when the value of the pointer indicates that the second unit was available for determining its position, and for estimating the value; and determining an estimate of the position from which to read a second unit depending on the value of the pointer, and positioning the reading means for searching for the second unit, when the value of the pointer indicates that the second unit was not available for determining its position.

24. A transmitter for real time information to be recorded on a record carrier, comprising:

an input for receiving a real time information signal subdivided into units;

means for buffering the units of the real time information in a buffer as they are provided until they are transmitted;

for a first unit contained in the buffer, means for calculating the value of a forward pointer, the value being information used for determining the position of a second unit on a record carrier forward from the position of the first unit on the record carrier, the position of the second unit being at least partially independent of the time of the second unit, the calculated value of the pointer being based on the buffered real time information and/or a predefined value, the value of the pointer being calculated before the second unit is received;

inserting the forward pointer with the calculated value into the first unit; and transmitting the real time information signal including the first unit containing the forward pointer.

25. A recorder for recording real time information comprising:

an input for receiving a real time information signal subdivided into units;

means for buffering the real time in a buffer as it is received until it is recorded;

for a first unit contained in the buffer, means for calculating a value for a pointer, the value being information used for determining the position of a second unit on a record carrier forward from the position of the first unit on the record carrier, the value of the pointer being based on the buffered real time information and/or a predefined value;

inserting the pointer with the calculated value into the fist unit;

recording the buffered real time information including the first unit containing the forward pointer.

26. The recorder of claim 25, further comprising formatting means with an input for receiving a real time information signal and subdividing the signal into units and an output for supplying the real time information signal subdivided into units.

27. The recorder of claim 25, wherein the value of the forward pointer is indicative of the position on the record carrier of the second unit.

28. The recorder of claim 26, wherein the indicated position is with respect to a position of the first unit on the record carrier.

29. The recorder of claim 25, wherein:

multiple units contain multiple pointers which include forward speed pointers for playing sequences of the units at a speed faster than real time;

the values of multiple forward speed pointers for the faster speed indicate the positions of units located at a predefined amount of time forward when the units being pointed to are available for determining their position, and the values of multiple forward speed pointers indicate positions that are different than the predefined amount of time when units at the predefined amount of time forward are not available in the buffer when the value of the pointer is calculated.

30. The recorder of claim 29, wherein the calculated values of a forward speed pointer indicates the position of the last unit within the buffer when the value of the pointer is calculated.

31. The recorder of claim 29, wherein a predefined value of a forward speed pointer indicates the non-existence of a unit at the predefined forward amount of time.

32. The recorder of claim 25, wherein the recording format is the DVD format.

33. The recorder of claim 25, wherein the value of the pointer is useful for determining the position of audio synchronizing information, and the value is a default value when the audio synchronizing information is not available in the buffer when the value of the audio synchronizing pointer is calculated or the value indicates the position of the audio synchronizing information when the buffer has a sufficient size to include a period of the real time information at least equal to a maximum skew between audio and video to enable determining the position for the value for the audio synchronizing pointer.

34. The recorder of claim 25, wherein the received real time information is divided into cells with a predefined uniform playing time, the cells having varying numbers of units, the value of the forward speed pointers indicate the positions of the cells on the record carrier.

35. A record carrier containing a real time information signal, produced by a method comprising:

receiving a real time information signal subdivided into units;

buffering the units of the real time information in a buffer as they are received until they are transmitted;

for a first unit contained in the buffer, calculating the value of a forward pointer, the value being information used for determining the position of a second unit on the record carrier forward from the position of the first unit on the record carrier, the calculated value of the pointer being based on the buffered real time information and/or a predefined value, the value of the pointer being calculated before the second unit is received;

inserting the forward pointer with the calculated value into the first unit; and forming the disc containing the real time information signal including the first unit containing the pointer.

* * * * *